US009715332B1

(12) United States Patent
Morris

(10) Patent No.: US 9,715,332 B1
(45) Date of Patent: *Jul. 25, 2017

(54) METHODS, SYSTEMS, AND COMPUTER PROGRAM PRODUCTS FOR NAVIGATING BETWEEN VISUAL COMPONENTS

(71) Applicant: CYPRESS LAKE SOFTWARE, INC., Woodville, TX (US)

(72) Inventor: Robert Paul Morris, Raleigh, NC (US)

(73) Assignee: Cypress Lake Software, Inc., Woodville, TX (US)

( * ) Notice: Subject to any disclaimer, the term of this patent is extended or adjusted under 35 U.S.C. 154(b) by 212 days.

This patent is subject to a terminal disclaimer.

(21) Appl. No.: 14/173,806

(22) Filed: Feb. 5, 2014

Related U.S. Application Data

(63) Continuation-in-part of application No. 12/868,767, filed on Aug. 26, 2010, now Pat. No. 8,661,361, and a continuation-in-part of application No. 12/956,008, filed on Nov. 30, 2010, now Pat. No. 8,780,130, and a continuation-in-part of application No. 12/955,993, filed on Nov. 30, 2010, now abandoned.

(51) Int. Cl.
*G06F 3/00* (2006.01)
*G06F 3/0484* (2013.01)
*G06F 3/0482* (2013.01)
*G06F 3/01* (2006.01)

(52) U.S. Cl.
CPC ........ *G06F 3/04842* (2013.01); *G06F 3/0482* (2013.01)

(58) Field of Classification Search
None
See application file for complete search history.

(56) References Cited

U.S. PATENT DOCUMENTS

| 5,487,143 A | 1/1996 | Southgate |
| 5,577,187 A | 11/1996 | Mariani |
| 5,712,995 A | 1/1998 | Cohn |

(Continued)

FOREIGN PATENT DOCUMENTS

WO 0057281 A1 9/2000

OTHER PUBLICATIONS

Neowin, "WindowSpace v2.0 Beta—Snapping like in Windows 7," available at http://www.neowin.net/news/windowspace-v20-beta---snapping-like-in-windows-7 (posted Apr. 29, 2009).

(Continued)

*Primary Examiner* — Toan Vu
(74) *Attorney, Agent, or Firm* — Patrick E. Caldwell, Esq.; The Caldwell Firm, LLC

(57) ABSTRACT

Methods and systems are described for navigating between visual components. A first visual component, of a first operating application in a plurality of operating applications, is detected in a first application region of a presentation space of a display device. A first navigation control is presented, in a first navigation region determined based on the first application region, for navigating to a second visual component, of a second application in the plurality, in a second application region in the presentation space. A user input corresponding to the first navigation control is detected. In response to the detected user input, navigation information is sent to navigate to the second visual component.

156 Claims, 13 Drawing Sheets

(56) References Cited

U.S. PATENT DOCUMENTS

| | | |
|---|---|---|
| 6,008,809 A | 12/1999 | Brooks |
| 6,072,486 A | 6/2000 | Sheldon et al. |
| 6,266,059 B1 | 7/2001 | Matthews, III et al. |
| 6,724,403 B1 | 4/2004 | Santoro et al. |
| 7,552,397 B2 | 6/2009 | Holecek et al. |
| 7,783,990 B2 | 8/2010 | Amadio et al. |
| 7,933,632 B2 | 4/2011 | Flynt et al. |
| 8,166,411 B2 | 4/2012 | Zhang |
| D665,405 S | 8/2012 | Williams et al. |
| 8,266,541 B2 | 9/2012 | Ishibashi |
| 8,320,026 B2 | 11/2012 | Tanaka |
| 8,341,541 B2 | 12/2012 | Holecek et al. |
| 8,356,258 B2 | 1/2013 | Matthews et al. |
| 8,379,058 B2 | 2/2013 | Kraut |
| 8,381,127 B2 | 2/2013 | Singh et al. |
| 8,457,692 B2 | 6/2013 | Fyke et al. |
| 8,490,019 B2 | 7/2013 | Jarrett et al. |
| 8,560,959 B2 | 10/2013 | Zaman et al. |
| 8,600,446 B2 | 12/2013 | Chiang et al. |
| 8,633,900 B2 | 1/2014 | Jin et al. |
| 8,667,415 B2 | 3/2014 | Rudolph et al. |
| 8,687,023 B2 | 4/2014 | Markiewicz et al. |
| 8,830,270 B2 | 9/2014 | Zaman et al. |
| 8,869,027 B2 | 10/2014 | Louch et al. |
| 8,893,033 B2 | 11/2014 | Donahue et al. |
| 8,922,575 B2 | 12/2014 | Garside et al. |
| 8,935,631 B2 | 1/2015 | Leonard et al. |
| 8,954,871 B2 | 2/2015 | Louch et al. |
| 8,990,733 B2 | 3/2015 | Deutsch et al. |
| 8,992,323 B2 | 3/2015 | Kelly et al. |
| 9,032,318 B2 | 5/2015 | Louch et al. |
| 9,043,712 B2 | 5/2015 | Santoro et al. |
| 9,104,294 B2 | 8/2015 | Forstall et al. |
| 2004/0066414 A1 | 4/2004 | Czerwinski et al. |
| 2004/0243938 A1 | 12/2004 | Weise et al. |
| 2005/0010876 A1 | 1/2005 | Robertson et al. |
| 2005/0198584 A1 | 9/2005 | Matthews et al. |
| 2006/0015246 A1 | 1/2006 | Hui |
| 2006/0224992 A1 | 10/2006 | Rossi et al. |
| 2007/0234221 A1 | 10/2007 | Ishibashi |
| 2008/0109753 A1 | 5/2008 | Karstens |
| 2009/0044138 A1 | 2/2009 | Rudolph et al. |
| 2009/0199128 A1 | 8/2009 | Matthews et al. |
| 2009/0228824 A1 | 9/2009 | Forstall et al. |
| 2009/0300552 A1 | 12/2009 | Bollman et al. |
| 2009/0303242 A1 | 12/2009 | Kraut |
| 2010/0169814 A1 | 7/2010 | Zhang |
| 2010/0281372 A1 | 11/2010 | Lyons et al. |
| 2010/0299597 A1 | 11/2010 | Shin et al. |
| 2010/0302172 A1 | 12/2010 | Wilairat |
| 2011/0219330 A1* | 9/2011 | Ando ............... G01C 21/3664 715/784 |
| 2011/0231878 A1 | 9/2011 | Hunter et al. |
| 2011/0302528 A1 | 12/2011 | Starr |
| 2012/0011437 A1* | 1/2012 | James ............... G06F 1/1643 715/702 |
| 2012/0023453 A1* | 1/2012 | Wagner ............ G06F 3/04886 715/848 |
| 2012/0036443 A1 | 2/2012 | Ohmori et al. |
| 2012/0072867 A1 | 3/2012 | Schlegel |
| 2012/0084711 A1* | 4/2012 | Duarte ............. G06F 3/0481 715/783 |
| 2012/0084713 A1 | 4/2012 | Desai et al. |
| 2012/0096397 A1 | 4/2012 | Ording et al. |
| 2012/0154424 A1 | 6/2012 | Klotzer |
| 2012/0167011 A1 | 6/2012 | Zaman et al. |
| 2012/0304114 A1 | 11/2012 | Wong et al. |
| 2013/0047117 A1 | 2/2013 | Deutsch et al. |
| 2013/0063442 A1 | 3/2013 | Zaman et al. |
| 2013/0063490 A1 | 3/2013 | Zaman et al. |
| 2013/0198692 A1* | 8/2013 | Lin .................. G06F 3/0483 715/835 |
| 2013/0326401 A1* | 12/2013 | van Os ............. G06F 3/0483 715/802 |
| 2014/0136979 A1* | 5/2014 | Morotomi ........ H04M 1/72522 715/716 |
| 2014/0245142 A1* | 8/2014 | Dresti .............. G06F 3/0484 715/708 |
| 2015/0020101 A1* | 1/2015 | Brown ............. H04N 5/44543 725/40 |
| 2015/0040057 A1* | 2/2015 | Smuga ............. G06F 3/0482 715/779 |
| 2015/0128059 A1* | 5/2015 | Bakhash ........... G06F 3/04815 715/739 |
| 2015/0227283 A1* | 8/2015 | Luna ................ G06F 3/04815 715/745 |
| 2015/0331571 A1* | 11/2015 | Chaudhri ......... G06F 3/04883 715/830 |

OTHER PUBLICATIONS

"Xerox Star," available at https://web.archive.org/web/20100101040301/http://toastytech.com/guis/star.html (posted on Jan. 1, 2010).

Warren Teitelman, "Ten Years of Window Systems—A Retrospective View," available at https://web.archive.org/web/20100316102701/http://www.chilton-computing.org.uk/inf/literature/books/wm/p004.htm (posted on Mar. 10, 2010).

"Window tiling history," available at https://web.archive.org/web/20100330011025/http://mnemonikk.org/talks/tiling-wm.en.html (posted on Mar. 30, 2010).

"Comparison of tiling window managers," available at https://wiki.archlinux.org/index.php?title=Comparison_of_tiling_window_managers&oldid=112641 (posted on Jul. 26, 2010).

Jim Allchin, "The Sounds of Windows Vista," available at https://web.archive.org/web/20061110152317/http://windowsvistablog.com/blogs/windowsvista/archive/2006/11/09/the-sounds-of-windows-vista.aspx (posted on Nov. 9, 2006).

Long Zheng, "From Microsoft patent to Windows reality: 'X-ray browsing', circa 2005; Aero Peek, circa 2008," available at http://www.istartedsomething.com/20081130/from-microsoft-patent-to-windows-reality-x-ray-browsing-aero-peek/ (posted on Nov. 30, 2008).

Steven Sinofsky, "Touching Windows 7," available at http://blogs.msdn.com/b/e7/archive/2009/03/25/touching-windows-7.aspx (posted on Mar. 25, 2009).

Kiriaty and Goldshtein, "Inside Windows 7—Introducing the Taskbar APIs," available at https://msdn.microsoft.com/en-us/magazine/dd942846.aspx (posted Jul. 2009).

Ina Fried, "Vista won't show fancy side to pirates," available at http://www.cnet.com/news/vista-wont-show-fancy-side-to-pirates/ (posted Apr. 14, 2006).

Klint Finley, "Microsoft Rolls Out Office Web Apps," available at http://readwrite.com/2010/06/08/microsoft-rolls-out-office-web (posted on Jun. 8, 2010).

Microsoft, "Microsoft to Extend Office to the Browser," available at http://news.microsoft.com/2008/10/28/microsoft-to-extend-office-to-the-browser/ (posted on Oct. 28, 2008).

Microsoft, "Microsoft Web Apps: Office Goes to the Web," available at http://news.microsoft.com/2009/09/17/microsoft-web-apps-office-goes-to-the-web/ (posted on Sep. 17, 2009).

Microsoft, "Microsoft Office 2010 Hits Major Milestone and Enters Technical Preview," available at http://news.microsoft.com/2009/07/13/microsoft-office-2010-hits-major-milestone-and-enters-technical-preview/ (posted on Jul. 13, 2009.

Ina Fried, "Next version of Office heads to the browser," available at http://www.cnet.com/news/next-version-of-office-heads-to-the-browser/ (posted on Apr. 9, 2009).

Sarah Perez, "Microsoft Office Web Applications: Your Burning Questions Answered," available at https://channel9.msdn.com/blogs/coolstuff/microsoft-office-web-applications-your-burning-questions-answered (posted on Nov. 10, 2008).

Microsoft Blog Post, "Windows Desktop Sharing API," Posted Mar. 8, 2007, available at https://blogs.technet.microsoft.com/enterprisemobility/2007/03/08/windows-desktop-sharing-api/.

(56) References Cited

OTHER PUBLICATIONS

Youtube Video and Transcript, "Intel Wireless Display Demo | Intel," Uploaded Jan. 10, 2010, available at https://www.youtube.com/watch?v=5Gm4ADoMFus.
Youtube Video and Transcript, "Office Live Meeting Demo 1: Join a meeting," Uploaded Jan. 8, 2008, available at https://www.youtube.com/watch?v=h9MYNKVg0W8.
First Alliance "Security Camera Systems for Your Business or Home," available at https://web.archive.org/web/20100615200435/http://www.faps.com/PC_DVR_H.264_.htm (psoted on Jun. 15, 2010) .
Richard Leadbetter, "Digital Foundry vs. Halo: Reach beta," available at http://www.eurogamer.net/articles/digitalfoundry-vs-halo-reach-beta-article?page=3 (posted on Jan. 5, 2010) .
Jason Fitzpatrick, "Split Screen Slices Your Chrome Window into Two Panes," available at http://lifehacker.com/5511986/split-screen-slices-your-chrome-window-into-two-panes (posted on Apr. 8, 2010).
DonationCoder, "Grid Move," available at https://web.archive.org/web/20100208182814/http://jgpaiva.dcmembers.com/gridmove.html (posted on Feb. 8, 2010).
"100 open source gems—part 2," available at http://www.tuxradar.com/content/100-open-source-gems-part-2 (posted on May 21, 2009).
Homepage from "Splitview" website, available at https://web.archive.org/web/20090314055048/http://www.splitview.com/ (posted Mar 14, 2009).
Homepage from "Soulid Studio" website, available at https://web.archive.org/web/20100515190349/http://www.soulidstudio.com/ (posted May 15, 2010).
"Divvy for Mac OS X," available at https://web.archive.org/web/20100514104937/http://mizage.com/divvy (posted on May 14, 2010).
Nurgo Software, "AquaSnap," available at https://web.archive.org/web/20100330083810/http://www.nurgo-software.com/products/aquasnap (posted on Mar. 30, 2010).
Hompage to "Winsplit Revolution," available at https://web.archive.org/web/20091001024135/http://www.winsplit-revolution.com/ (posted on Oct. 1, 2009).
Google, "What is bug.n?," available at https://web.archive.org/web/20100326203241/http://code.google.com/p/bugn (posted on Mar. 26, 2010).
ZaneA, "HashTWM," available at https://web.archive.org/web/20100303233018/http://github.com/ZaneA/HashTWM (published Oct. 25, 2009).
Homepage to "MaxTo," available at https://web.archive.org/web/20090522042853/http://www.maxto.net/ (posted May 22, 2009).
Office Action Summary from U.S. Appl. No. 14/924,677, dated Feb. 3, 2016.
CNET video, "Touch-screen features in Windows 7: CNET First Look" (Jul. 17, 2009), CNET Video Post, available at https://www.cnet.com/videos/touch-screen-features-in-windows-7/.
Steven Sinofsky, "Designing Aero Snap" (Mar. 17, 2009), Microsoft Blog Post, available at https://blogs.msdn.microsoft.com/e7/2009/03/17/designing-aero-snap/.
Gina Trapani, "Snap Any Window to Half the Screen Size in Windows 7" (Nov. 5, 2008), Lifehacker Blog Post, available at http://lifehacker.com/5077728/snap-any-window-to-half-the-screen-size-in-windows-7.
Office Action Summary from U.S. Appl. No. 14/924,709 dated Feb. 22, 2017.

\* cited by examiner

METHODS, SYSTEMS, AND COMPUTER PROGRAM PRODUCTS FOR NAVIGATING BETWEEN VISUAL COMPONENTS

RELATED APPLICATIONS

The present application is a continuation-in-part of, and claims priority to U.S. patent application Ser. No. 12/868,767, titled "METHODS, SYSTEMS, AND COMPUTER PROGRAM PRODUCTS FOR NAVIGATING BETWEEN VISUAL COMPONENTS," filed on Aug. 26, 2010, U.S. patent application Ser. No. 12/956,008, titled "METHODS, SYSTEMS, AND COMPUTER PROGRAM PRODUCTS FOR BINDING ATTRIBUTES BETWEEN VISUAL COMPONENTS," filed on Nov. 30, 2010, and U.S. patent application Ser. No. 12/955,993, titled "METHODS, SYSTEMS, AND COMPUTER PROGRAM PRODUCTS FOR AUTOMATICALLY SCROLLING ITEMS IN A SELECTION CONTROL," filed on Nov. 30, 2010, all of which are incorporated herein by reference in their entirety for all purposes.

BACKGROUND

Cluttered desktops on desktop, notebook, and handheld devices are common. Navigating among visual components of various applications requires locating a desired visual component in the clutter and/or interoperating with a standard user interface element such as a task bar and/or application menu of a desktop that remains in a single location and requires the same types of inputs and user movements for each application and/or visual component to be located. This may require a user to repeat a similar and/or same set of movements over and over. Further, a task bar or other standard application navigation user interface may be located in a location that is convenient for some applications but inconvenient for others for a user. This creates a lot of input overhead in cases where switching between applications is frequent. Input to bring an application into focus is essentially non-productive input, as it is not related to any of the tasks performed by the applications a user is interacting with.

Accordingly, there exists a need for methods, systems, and computer program products for navigating between visual components.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for navigating between visual components. In one aspect, the method includes detecting, in a first application region of a presentation space of a display device, a first visual component of a first operating application in a plurality of operating applications. The method further includes presenting a first navigation control, in a first navigation region determined based on the first application region, for navigating to a second visual component, of a second application in the plurality, in a second application region in the presentation space. The method still further includes detecting a user input corresponding to the first navigation control. The method additionally includes sending, in response to detecting the user input, navigation information to navigate to the second visual component.

Further, a system for navigating between visual components is described. The system includes a presentation space monitor component, an application navigator component, a navigation element handler component, and a navigation director component adapted for operation in an execution environment. The system includes the presentation space monitor component configured for detecting, in a first application region of a presentation space of a display device, a first visual component of a first operating application in a plurality of operating applications. The system further includes the application navigator component configured for presenting a first navigation control, in a first navigation region determined based on the first application region, for navigating to a second visual component, of a second application in the plurality, in a second application region in the presentation space. The system still further includes the navigation element handler component configured for detecting a user input corresponding to the first navigation control. The system additionally includes the navigation director component configured for sending, in response to detecting the user input, navigation information to navigate to the second visual component.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
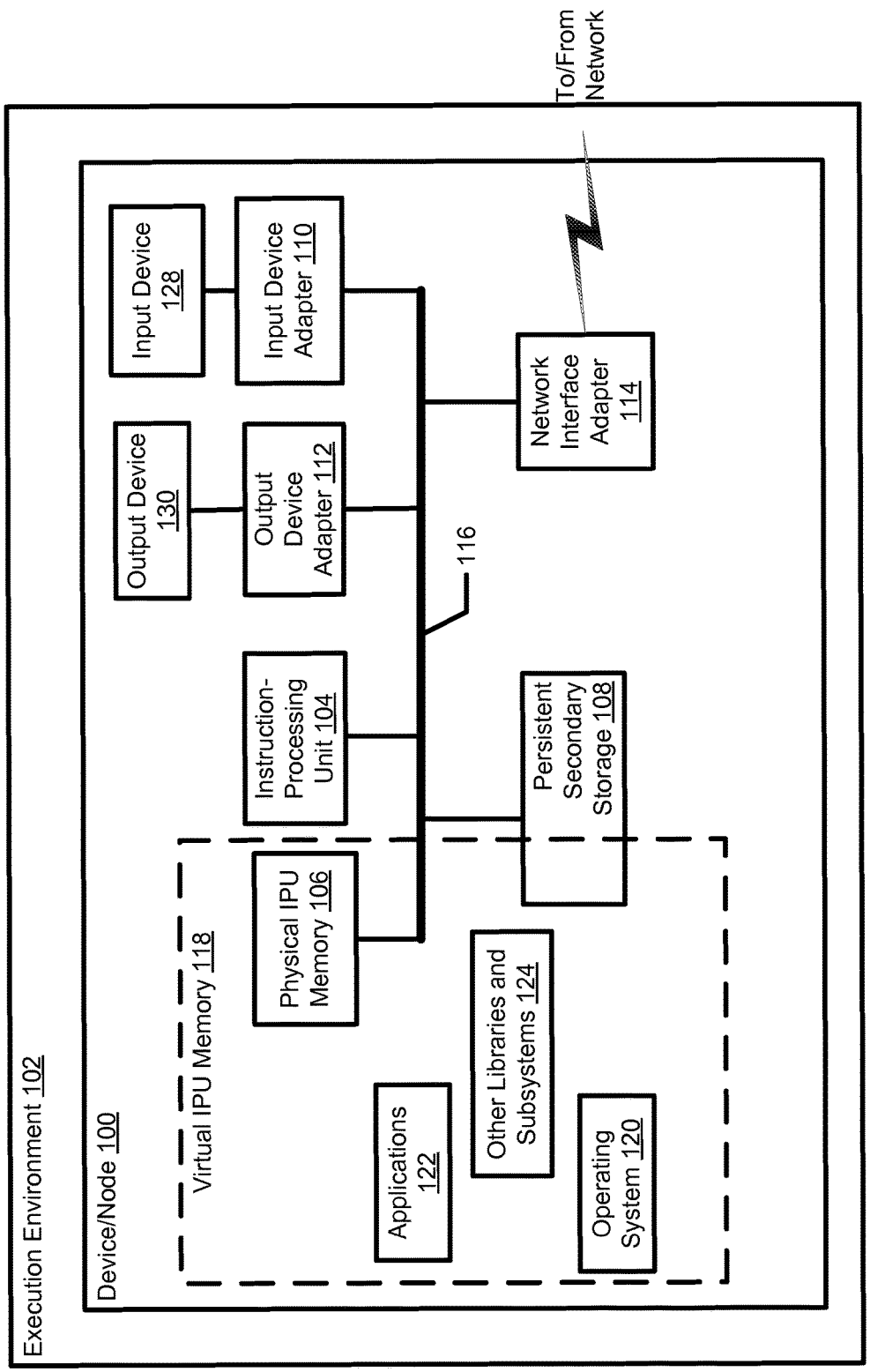
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art that one or more aspects of the disclosure may be practiced with a lesser degree of these specific details. In other instances, well-known structures and devices are shown in block diagram form in order to facilitate describing one or more aspects of the disclosure.

An exemplary device included in an execution environment that may be configured according to the subject matter is illustrated in FIG. 1. An execution environment includes an arrangement of hardware and, optionally, software that may be further configured to include an arrangement of components for performing a method of the subject matter described herein. An execution environment includes and/or is otherwise provided by one or more devices. An execution environment may include a virtual execution environment including software components operating in a host execution environment. Exemplary devices included in or otherwise providing suitable execution environments for configuring according to the subject matter include personal computers, notebook computers, tablet computers, servers, handheld and other mobile devices, multiprocessor devices, distributed devices, consumer electronic devices, routers, communication servers, and/or other network-enabled devices. Those skilled in the art will understand that the components illustrated in FIG. 1 are exemplary and may vary by particular execution environment.

FIG. 1 illustrates hardware device 100 included in execution environment 102. FIG. 1 illustrates that execution environment 102 includes instruction-processing unit (IPU) 104, such as one or more microprocessors; physical processor memory 106 including storage locations identified by addresses in a physical memory address space of IPU 104; persistent secondary storage 108, such as one or more hard drives and/or flash storage media; input device adapter 110, such as a key or keypad hardware, a keyboard adapter, and/or a mouse adapter; output device adapter 112, such as a display or audio adapter for presenting information to a user; a network interface component, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSPs), graphics processing units, application-specific integrated circuits (ASICs), and/or field programmable gate arrays (FPGAs). In the description of the subject matter herein, the terms "IPU" and "processor" are used interchangeably. IPU 104 may access machine code instructions and data via one or more memory address spaces in addition to the physical memory address space. A memory address space includes addresses identifying locations in a processor memory. The addresses in a memory address space are included in defining a processor memory. IPU 104 may have more than one processor memory. Thus, IPU 104 may have more than one memory address space. IPU 104 may access a location in a processor memory by processing an address identifying the location. The processed address may be in an operand of a machine code instruction and/or may be identified in a register or other portion of IPU 104.

FIG. 1 illustrates virtual processor memory 118 spanning at least part of physical processor memory 106 and at least part of persistent secondary storage 108. Virtual memory addresses in a memory address space may be mapped to physical memory addresses identifying locations in physical processor memory 106. An address space for identifying locations in a virtual processor memory is referred to as a virtual memory address space; its addresses are referred to as virtual memory addresses; and its processor memory is known as a virtual processor memory or virtual memory. The term "processor memory" may refer to physical processor memory 106 and/or virtual processor memory 118 depending on the context in which the term is used.

Physical processor memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), and/or RAMBUS DRAM (RDRAM). Physical processor memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include removable media. The drives and their associated computer-readable storage media provide volatile and/or nonvolatile storage for computer-readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including operating system 120, one or more applications 122, and other program code and/or data components illustrated by other libraries and subsystems 124. In an aspect, some or all software components may be stored in locations accessible to IPU 104 in a shared memory address space shared by the software components. The software components accessed via the shared memory address space are stored in a shared processor memory defined by the shared memory address space. In another aspect, a first software component may be stored in one or more locations accessed by IPU 104 in a first address space and a second software component may be stored in one or more locations accessed by IPU 104 in a second address space. The first software component is stored in a first processor memory defined by the first address space and the second software component is stored in a second processor memory defined by the second address space.

Software components typically include instructions executed by IPU 104 in a computing context referred to as a "process". A process may include one or more "threads". A "thread" includes a sequence of instructions executed by IPU 104 in a computing sub-context of a process. The terms "thread" and "process" may be used interchangeably herein when a process includes only one thread.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical processor memory 106, and/or other components included in execution environment 102.

Output device 130, in FIG. 1, exemplifies one or more output devices that may be included in and/or may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user.

A device included in or otherwise providing an execution environment may operate in a networked environment communicating with one or more devices via one or more network interface components. The terms "communication interface component" and "network interface component" are used interchangeably. FIG. 1 illustrates network interface adapter (NIA) 114 as a network interface component included in execution environment 102 to operatively couple device 100 to a network. A network interface component includes a network interface hardware (NIH) component and optionally a software component.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "network node" and "node" in this document both refer to a device having a network interface component for operatively coupling the device to a network. The terms "device" and "node" as used herein further refer to one or more devices and nodes, respectively, providing and/or otherwise included in an execution environment unless clearly indicated otherwise.

Figure 2:
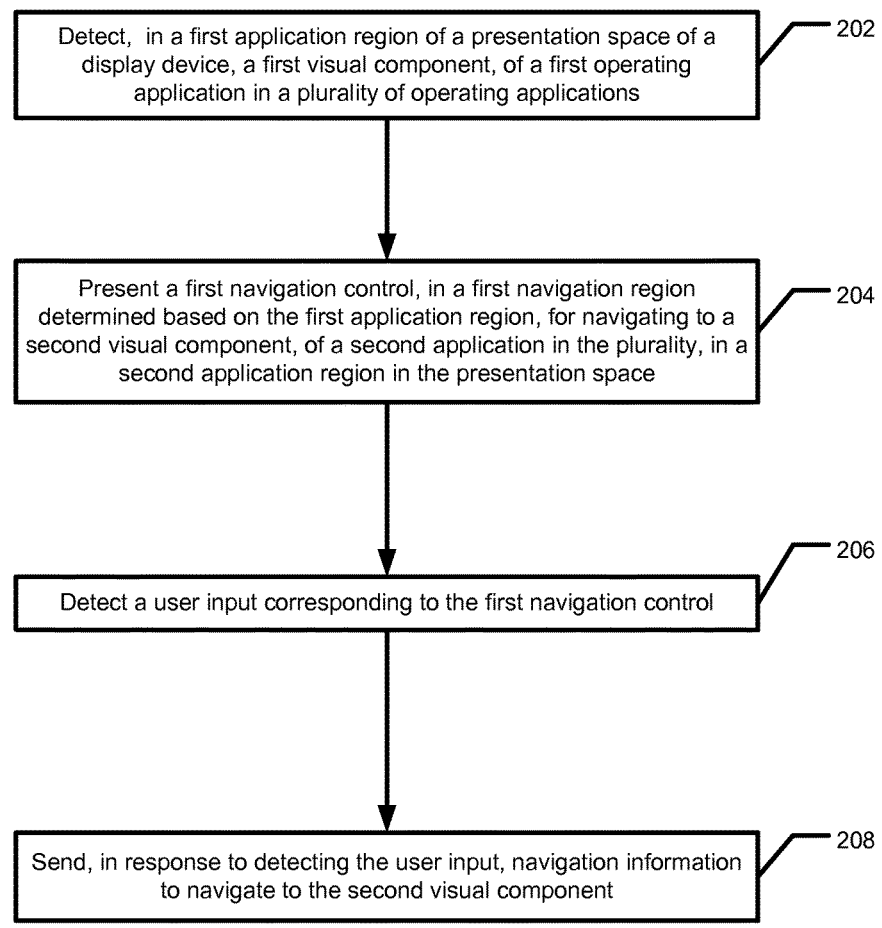
FIG. 2 is a flow diagram illustrating a method for navigating between visual components according to an aspect of the subject matter described herein.
Figure 3:
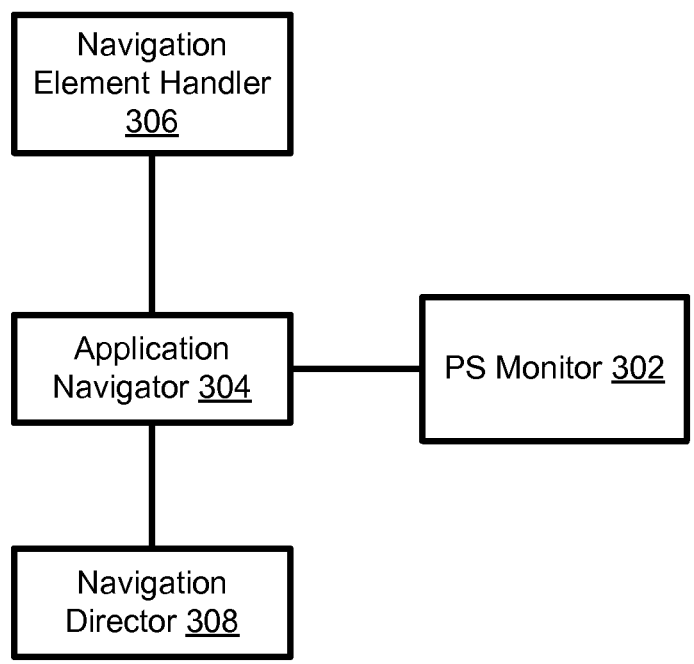
FIG. 3 is a block diagram illustrating an arrangement of components for navigating between visual components according to another aspect of the subject matter described herein.

The block diagram in FIG. 3 illustrates an exemplary system for navigating between visual components according to the method illustrated in FIG. 2. FIG. 3 illustrates a system, adapted for operation in an execution environment, such as execution environment 102 in FIG. 1, for performing the method illustrated in FIG. 2. The system illustrated includes a presentation space (PS) monitor component 302, an application navigator component 304, a navigation element handler component 306, and a navigation director component 308. The execution environment includes an instruction-processing unit, such as IPU 104, for processing an instruction in at least one of the presentation space monitor component 302, the application navigator component 304, the navigation element handler component 306, and the navigation director component 308. Some or all of the exemplary components illustrated in FIG. 3 may be adapted for performing the method illustrated in FIG. 2 in a number of execution environments. FIGS. 4*a-d* include block diagrams illustrating the components of FIG. 3 and/or analogs of the components of FIG. 3 adapted for operation in various execution environments 401 including and/or otherwise provided by one or more nodes.

FIG. 1 illustrates components of an exemplary device that may at least partially provide and/or otherwise be included in an execution environment. The components illustrated in FIGS. 4*a-d* may be included in or otherwise combined with the components of FIG. 1 to create a variety of arrangements of components according to the subject matter described herein.

Figure 4A:
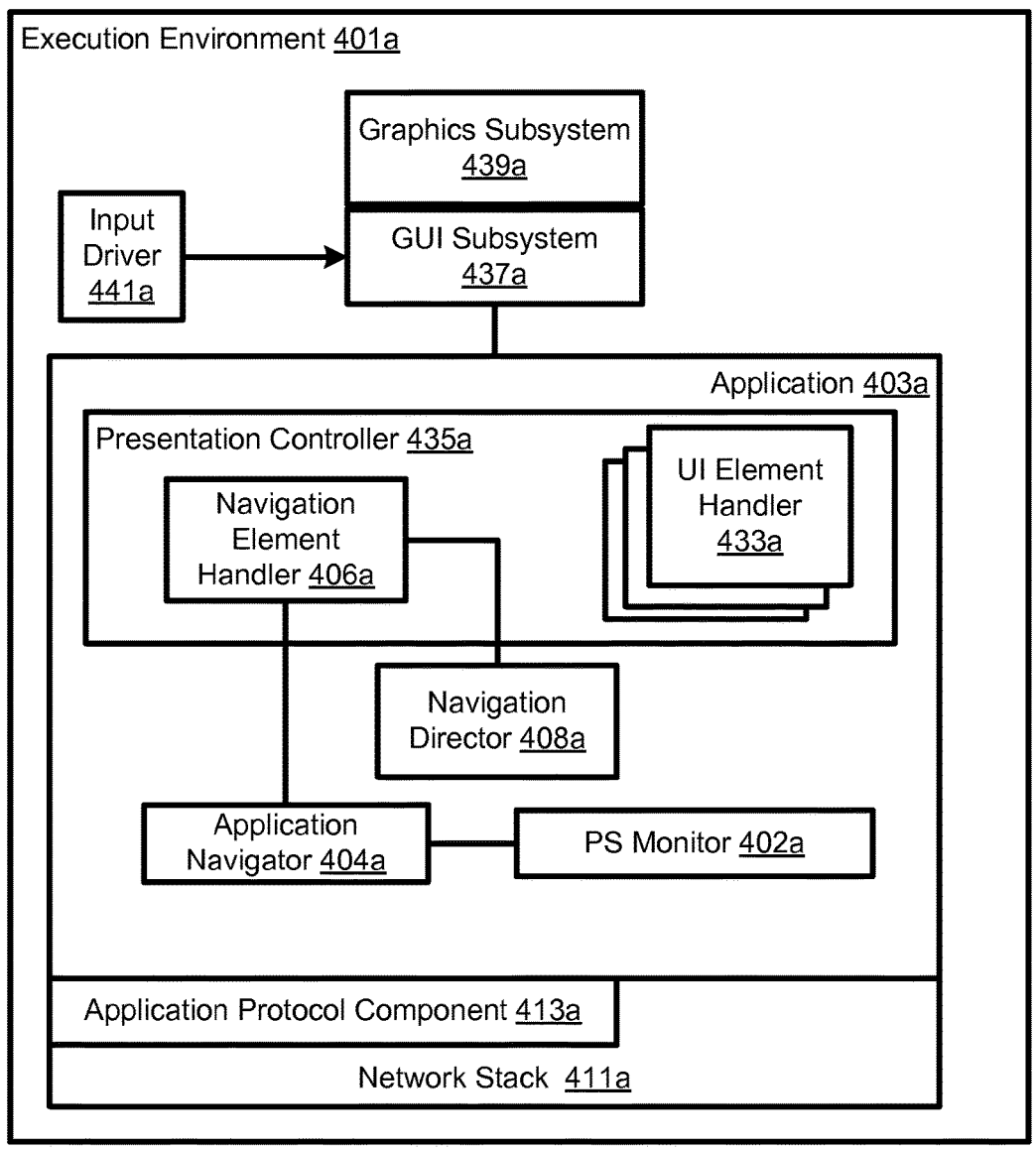
FIG. 4a is a block diagram illustrating an arrangement of components for navigating between visual components according to another aspect of the subject matter described herein.
Figure 4B:
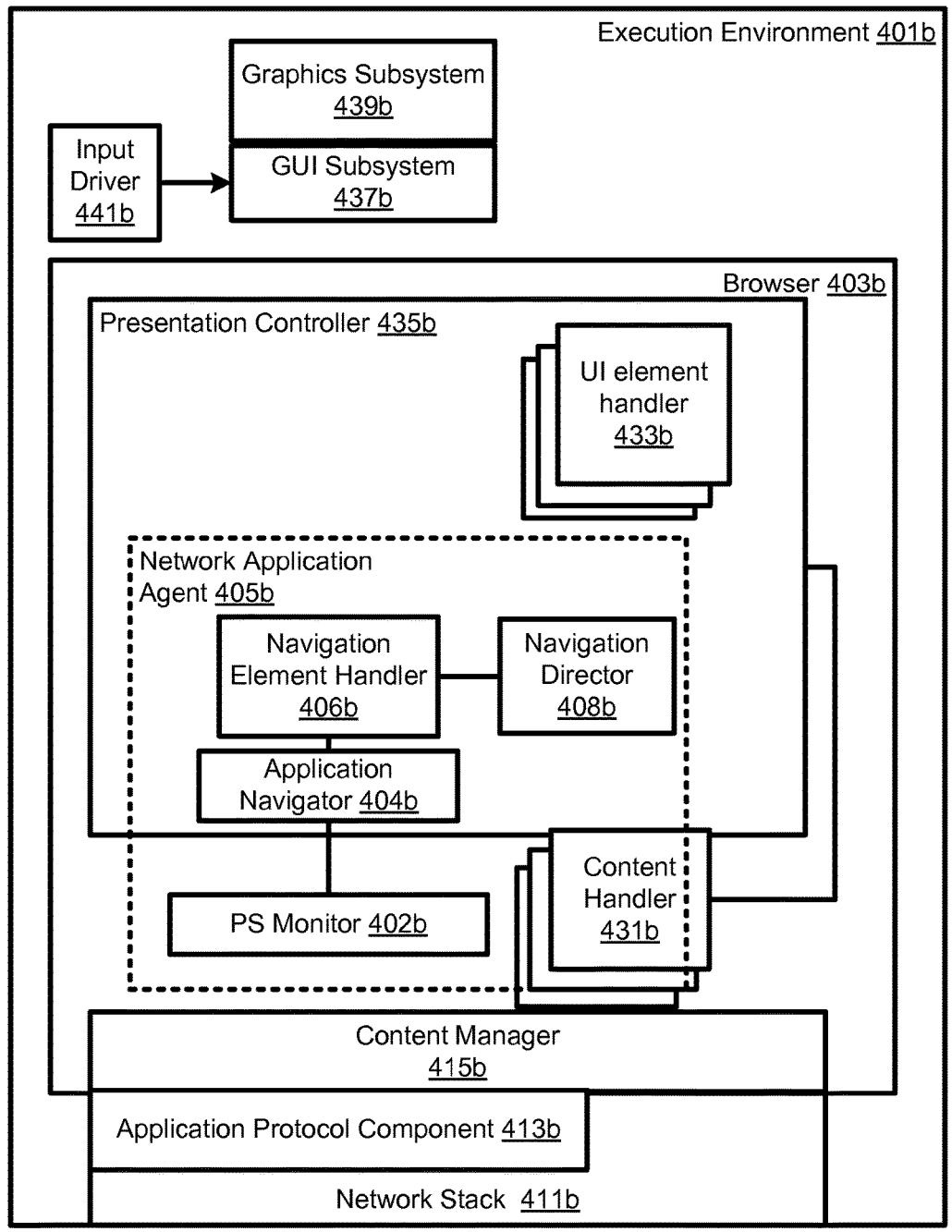
FIG. 4b is a block diagram illustrating an arrangement of components for navigating between visual components according to another aspect of the subject matter described herein.
Figure 4C:
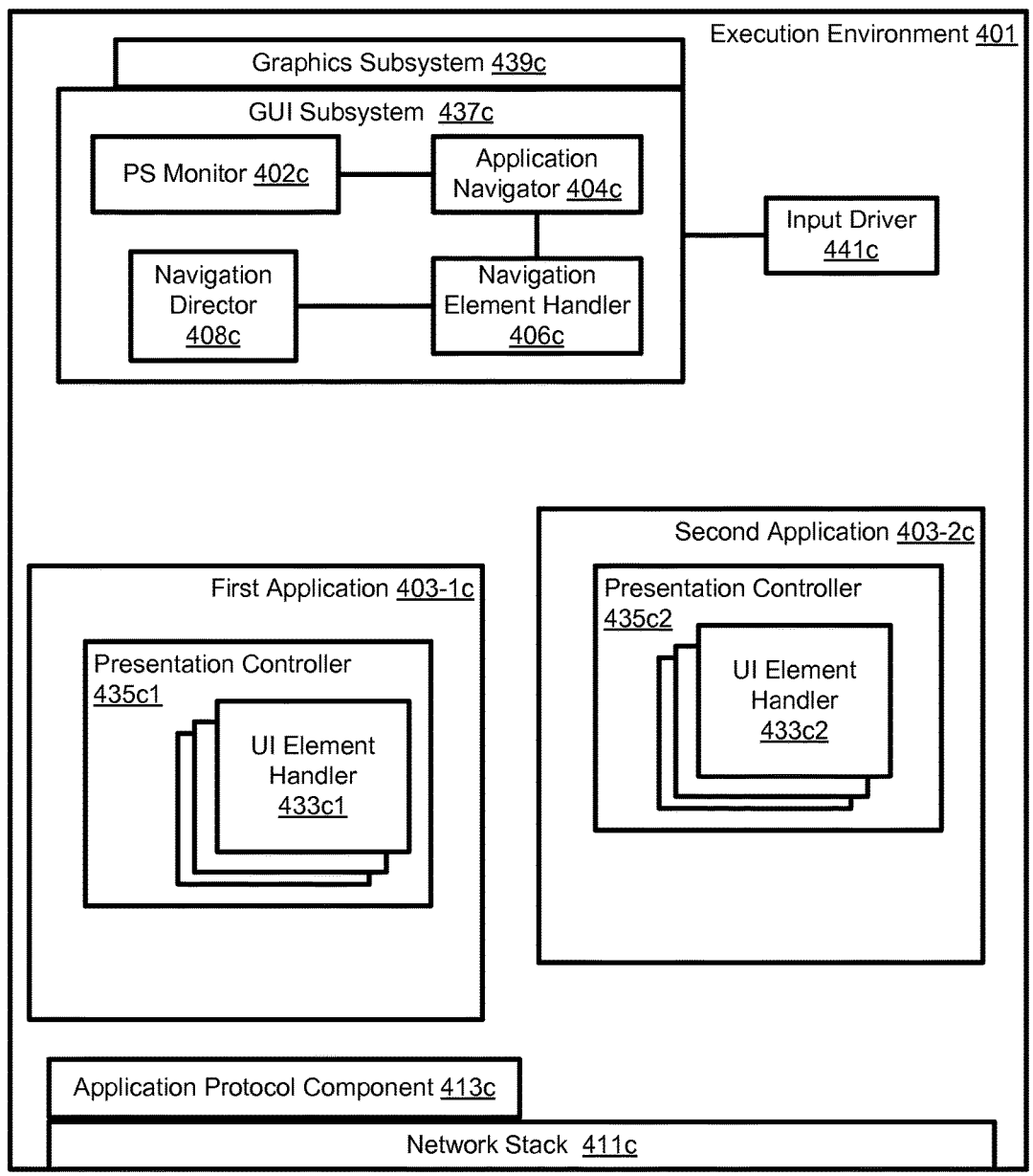
FIG. 4c is a block diagram illustrating an arrangement of components for navigating between visual components according to another aspect of the subject matter described herein.
Figure 4D:
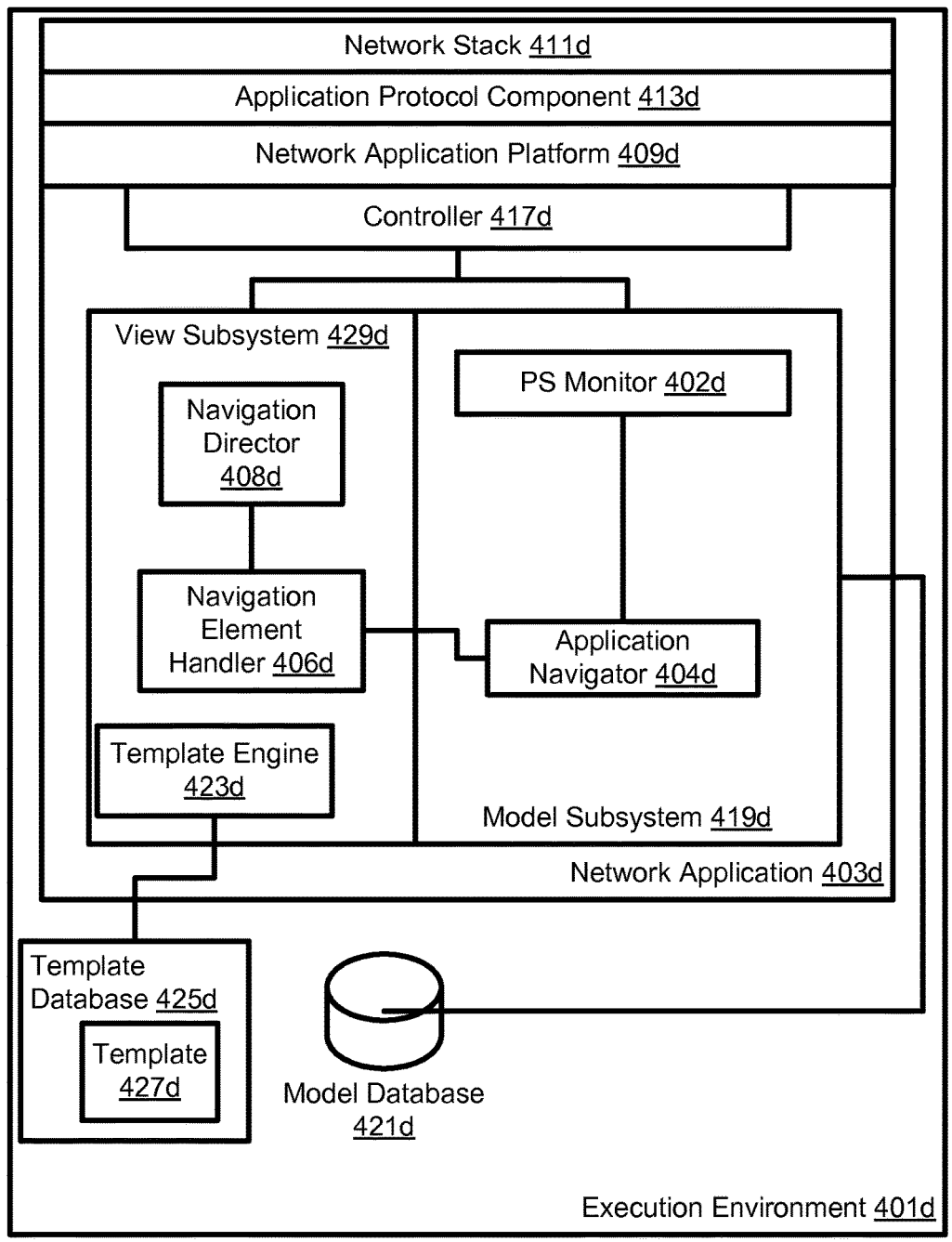
FIG. 4d is a block diagram illustrating an arrangement of components for navigating between visual components according to another aspect of the subject matter described herein.
Figure 5:
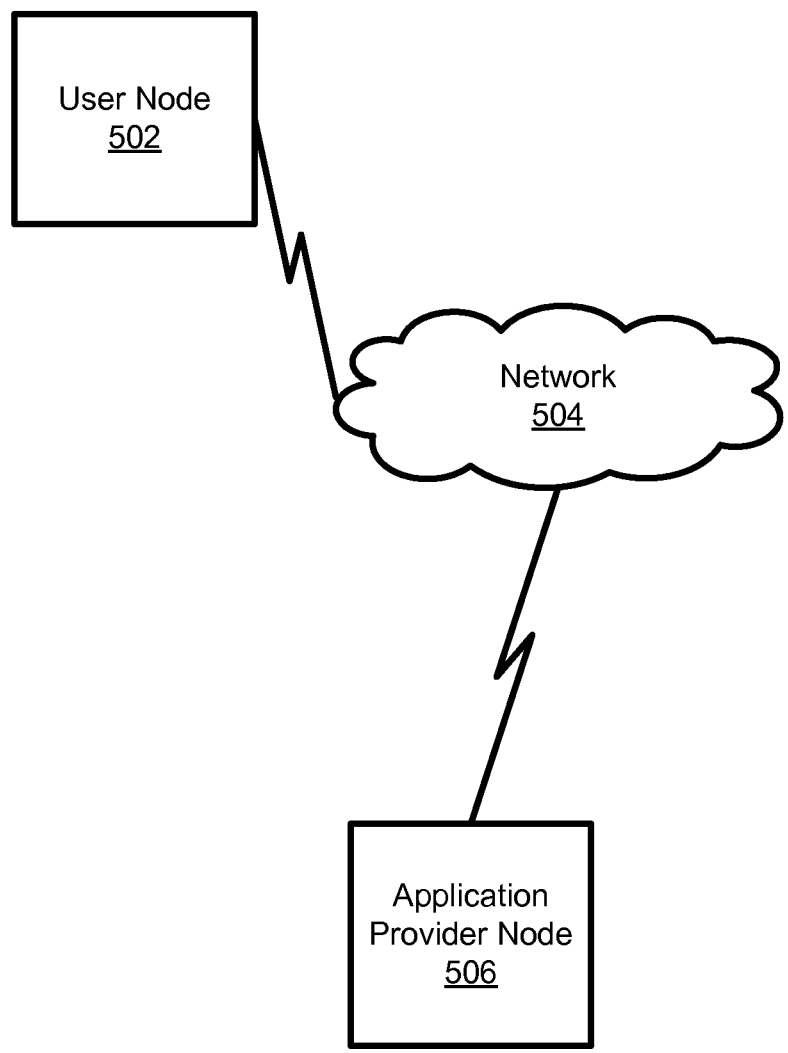
FIG. 5 is a network diagram illustrating an exemplary system for navigating between visual components according to another aspect of the subject matter described herein.

FIG. 5 illustrates user node 502 as an exemplary device that in various aspects may be included in and/or otherwise adapted for providing any of execution environments 401 illustrated in FIGS. 4*a-c*, each illustrating a different adaptation of the arrangement of components in FIG. 3. FIG. 5 illustrates that user node 502 is operatively coupled to network 504 via a network interface component, such as NIA 114. Alternatively or additionally, an adaptation of an execution environment 401 may include and/or may otherwise be provided by a device that is not operatively coupled to a network. Application provider node 506 may be included in and/or otherwise adapted for providing execution environment 401*d* illustrated in FIG. 4*d*. As illustrated in FIG. 5, application provider node 506 is operatively coupled to network 504 via a network interface component included in execution environment 401*d*.

FIG. 4*a* illustrates execution environment 401*a* hosting application 403*a* including an adaptation of the arrangement of components in FIG. 3. FIG. 4*b* illustrates execution environment 401*b* hosting browser 403*b* including an adaptation of the arrangement of components in FIG. 3 that may operate at least partially in a network application agent 405*b* received from a remote application provider, such as network application 403*d* in FIG. 4*d*. Browser 403*b* and execution environment 401*b* may provide at least part of an execution environment for network application agent 405*b* that may be received via a network from a network application operating in a remote execution environment. FIG. 4*c* illustrates an arrangement of the components in FIG. 3 adapted to operate in GUI subsystem 437*c* of execution environment 401*c*. The arrangement in FIG. 4*c* may mediate communication between applications in execution environment 401*c* and one or more output devices, such as output device 130 in FIG. 1.

FIG. 4*d* illustrates execution environment 401*d* configured to host one or more network applications, such as a Web service, illustrated by network application 403*d*. FIG. 4*d* also illustrates network application platform 409*d* that may provide services to one or more network applications. Network application 403*d* includes yet another adaptation of the arrangement of components in FIG. 3.

The various adaptations of the arrangement in FIG. 3 are not exhaustive. For example, those skilled in the art will see based on the description herein that arrangements of components for performing the method illustrated in FIG. 2 may be at least partially included in an application and at least partially external to the application. Further, arrangements for performing the method illustrated in FIG. 2 may be distributed across more than one node and/or execution environment. For example, such an arrangement may operate at least partially in browser 403*b* in FIG. 4*b* and at least partially in execution environment 401*d* in and/or external to network application 403*d* in FIG. 4*d*.

FIGS. 4*a*-*d* illustrate adaptations of network stacks 411*a*, 411*b*, 411*c*, 411*d* configured for sending and receiving messages over a network, such as network 504, via a network interface component. Network application platform 409*d* in FIG. 4*d* provides services to one or more network applications. In various aspects, network application platform 409*d* may include and/or interoperate with a web server. FIG. 4*d* also illustrates network application platform 409*d* configured for interoperating with network stack 411*d* directly and/or indirectly.

Network stacks 411*a*, 411*b*, 411*c*, 411*d* may support the same protocol suite, such as TCP/IP, or may communicate via a network gateway or other protocol translation device and/or service. For example, browser 403*b* in FIG. 4*b* and network application platform 409*d* in FIG. 4*d* may interoperate via their respective network stacks: network stack 411*b* and network stack 411*d*.

FIGS. 4*a*-*d* illustrate applications 403, respectively, which may communicate via one or more application layer protocols. FIGS. 4*a*-*d* respectively illustrate application protocol components 413*a*, 413*b*, 413*c*, 413*d* for communicating via one or more application layer protocols. Exemplary application protocols include hypertext transfer protocol (HTTP) and instant messaging and presence (XMPP-IM) protocol. Matching protocols enabling applications 403 to communicate via network 504 in FIG. 5 are not required, if communication is via a protocol gateway or other translator.

In FIG. 4*b*, browser 403*b* may receive some or all of network application agent 405*b* in one more messages sent from a network application, such as network application 403*d* via network application platform 409*d*, a network stack 411*b*, a network interface component, and optionally an application protocol component 413*b*. In FIG. 4*b*, browser 403*b* includes content manager component 415*b*. Content manager component 415*b* may interoperate with one or more of application protocol components 413*b* and/or network stack 411*b* to receive the message or messages including some or all of network application agent 405*b*.

Network application agent 405*b* may include a web page for presenting a user interface for network application 403*d*. The web page may include and/or reference data represented in one or more formats including hypertext markup language (HTML) and/or other markup language, ECMAScript and/or other scripting language, byte code, image data, audio data, and/or machine code.

In an example, in response to a request received from browser 403*b* in FIG. 4*b* operating in user node 502 in FIG. 5, controller component 417*d*, in FIG. 4*d*, operating in application provider node 506 may invoke model subsystem 419*d* to perform request-specific processing. Model subsystem 419*d* may include any number of request handlers (not shown) for dynamically generating data and/or retrieving data from model database 421*d* based on the request. Controller component 417*d* may further invoke template engine component 423*d* to identify one or more templates and/or static data elements for generating a user interface for representing a response to the received request. FIG. 4*d* illustrates template database 425*d* including exemplary template 427*d*. FIG. 4*d* illustrates template engine 423*d* as a component in view subsystem 429*d* configured to return responses to processed requests in a presentation format suitable for a client, such as browser 403*b*. View subsystem 429*d* may provide the presentation data to controller component 417*d* to send to browser 403*b* in response to the request received from browser 403*b*. Some or all of network application agent 405*b* may be sent to browser 403*b* via network application platform 409*d* as described above.

While the example above describes sending some or all of network application agent 405*b* in response to a request, network application 403*d* additionally or alternatively may send some or all of a network application agent to browser 403*b* via one or more asynchronous messages. An asynchronous message may be sent in response to a change detected by network application 403*d*. Publish-subscribe protocols, such as the presence protocol specified by XMPP-IM, are exemplary protocols for sending messages asynchronously.

The one or more messages including information representing some or all of network application agent 405*b* in FIG. 4*b* may be received by content manager component 415*b* via one or more of application protocol component(s) 413*b* and network stack 411*b* as described above. In FIG. 4*b*, browser 403*b* includes one or more content handler components 431*b* to process received data according to its data type, typically identified by a MIME-type identifier. Exemplary content handler components 431*b* include a text/html content handler component for processing HTML documents; an application/xmpp-xml content handler component for processing XMPP streams including presence tuples, instant messages, and publish-subscribe data as defined by various XMPP specifications; one or more video content handler components for processing video streams of various types; and still image data content handler components for processing various images types. Content handler components 431*b* process received data and may provide a representation of the processed data to one or more user interface (UI) element handler components 433*b*.

UI element handler components 433 are illustrated in presentation controller components 435 in FIG. 4*a*, FIG. 4*b*, and FIG. 4*c*. A presentation controller component 435 may manage visual, audio, and/or other types of output of its including application 403 as well as receive and route detected user and other inputs to components and extensions of its including application 403. With respect to FIG. 4b, a UI element handler component 433b in various aspects may be adapted to operate at least partially in a content handler component 431b such as a text/html content handler component and/or a script content handler component. Additionally or alternatively, a UI element handler component 433 in an execution environments 401 may operate in and/or as an extension of its including application 403, such as a plug-in providing a virtual machine for script and/or byte code, and/or may operate external to an interoperating application 403.

FIGS. 6a-e illustrate respective display presentation spaces 602 of a display in and/or operatively coupled to a device. FIGS. 6a-e illustrate first app 604-1a, 604-1b, 604-1c, 604-1d, 604-1e visual components and second app 604-2a, 604-2b, 604-2c, 604-2d, 604-2e visual components in respective presentation spaces 602. The various app 604 visual components illustrated in FIGS. 6a-e are described as user interfaces of various applications 403 and other components illustrated in FIGS. 4a-d as required in describing the subject matter herein. An app 604 visual component may be provided as a user interface of multiple applications interoperating. For example, an app 604 visual component and/or a visual component included in an app 604 visual component may be presented via interoperation of browser 403b, network application agent 405b, and network application 403d illustrated in FIG. 4b and FIG. 4d. Browser 403b may operate in user node 502 and network application 403d may operate in application provider node 506. Network application agent 405b may be provided to user node 502 by application provider node 506 via network 504, as described above.

Various UI elements of applications 403 described above may be presented by one or more UI element handler components 433 in FIGS. 4a-c and/or by one or more template engines 423d in FIG. 4d. In an aspect, illustrated in FIGS. 4a-c, UI element handler component(s) 433 of one or more applications 403 is/are configured to send presentation information representing a visual interface element, such as an operation bar 606 in FIG. 6a and in FIG. 6d, to a GUI subsystem 437. A GUI subsystem 437a, 437b, 437c may instruct a graphics subsystem 439a, 439b, 439c to draw the visual interface element in a region of a respective display presentation space 602, based on presentation information received from a corresponding UI element handler component 433.

Input may be received corresponding to a UI element via an input driver 441a, 441b, 441c illustrated in FIGS. 4a-c, in various adaptations. For example, a user may move a mouse to move a pointer presented in a display presentation space 602 over an operation user interface element presented in an operation bar 606. A user may provide an input detected by the mouse. The detected input may be received by a GUI subsystem 437a, 437b, 437c via an input driver 441a, 441b, 441c as an operation or command indicator based on the association of the shared location of the pointer and the operation user interface element in display presentation space 602.

The components of a user interface are generically referred to herein as user interface elements. More specifically, visual components of a user interface are referred to herein as visual interface elements. A visual interface element may be a visual component of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the elements listed. Those skilled in the art will understand that this list is not exhaustive. The terms "visual representation", "visual component", and "visual interface element" are used interchangeably in this document. Other types of user interface elements include audio output components referred to as audio interface elements, tactile output components referred to as tactile interface elements, and the like.

A "user interface (UI) element handler" component, as the term is used in this document, includes a component configured to send information representing a program entity for presenting a user-detectable representation of the program entity by an output device, such as a display. A "program entity" is an object included in and/or otherwise processed by an application or executable program component. The user-detectable representation is presented based on the sent information. The sent information is referred to herein as "presentation information". Presentation information may include data in one or more formats. Exemplary formats include image formats such as JPEG, video formats such as MP4, markup language data such as HTML and other XML-based markup, and/or instructions such as those defined by various script languages, byte code, and/or machine code. For example, a web page received by a browser from a remote application provider may include HTML, ECMAScript, and/or byte code for presenting one or more user interface elements included in a user interface of the remote application. Components configured to send information representing one or more program entities for presenting particular types of output by particular types of output devices include visual interface element handler components, audio interface element handler components, tactile interface element handler components, and the like.

A representation of a program entity may be stored and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space. A presentation space may be physically and/or logically contiguous or non-contiguous. A presentation space may have a virtual as well as a physical representation. A presentation space may include a storage location in a processor memory, secondary storage, a memory of an output adapter device, and/or a storage medium of an output device. A screen of a display, for example, is a presentation space.

As used herein, the term "program" or "executable" refer to any data representation that may be translated into a set of machine code instructions and optionally associated program data. Thus, a program component or executable component may include an application, a shared or non-shared library, and a system command. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear that state of the object code when it is relevant. This definition can include machine code and virtual machine code, such as Java™ byte code.

As used herein, an "addressable entity" is a portion of a program, specifiable in programming language in source code. An addressable entity is addressable in a program component translated from the source code in a compatible execution environment. Examples of addressable entities include variables, constants, functions, subroutines, procedures, modules, methods, classes, objects, code blocks, and labeled instructions. A code block includes one or more instructions in a given scope specified in a programming language. An addressable entity may include a value. In some places in this document "addressable entity" refers to a value of an addressable entity. In these cases, the context will clearly indicate that the value is being referenced.

Addressable entities may be written in and/or translated to a number of different programming languages and/or representation languages, respectively. An addressable entity may be specified in and/or translated into source code, object code, machine code, byte code, and/or any intermediate languages for processing by an interpreter, compiler, linker, loader, or analogous tool.

Figure 6A:
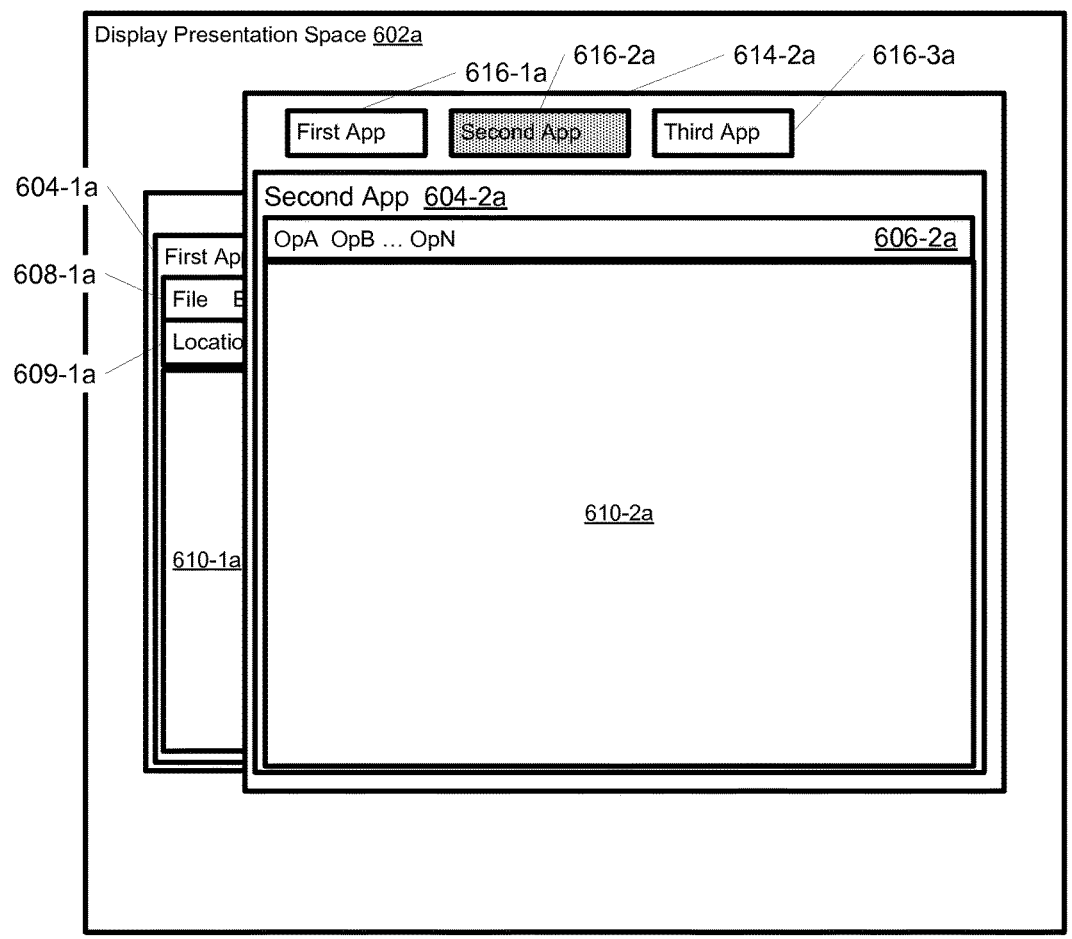
FIG. 6a is a diagram illustrating a user interface presented via a display according to another aspect of the subject matter described herein.
Figure 6B:
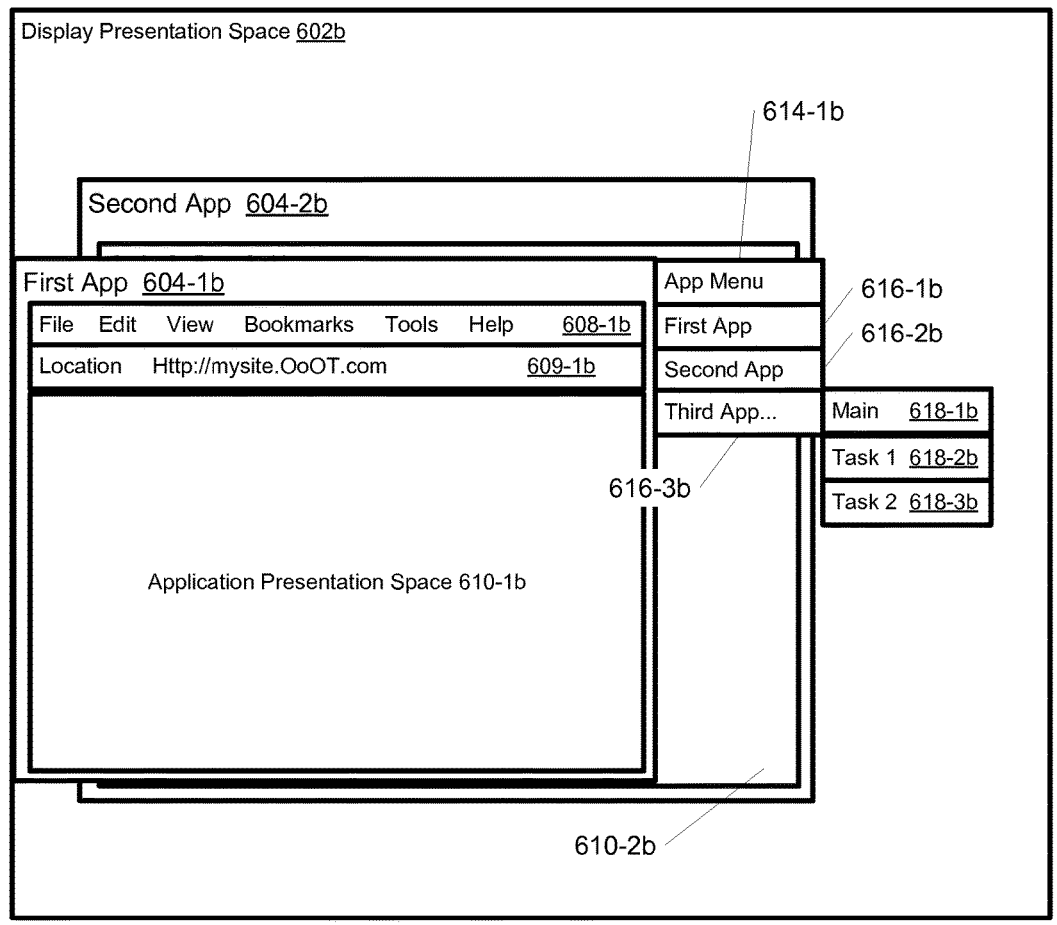
FIG. 6b is a diagram illustrating a user interface presented via a display according to another aspect of the subject matter described herein.
Figure 6C:
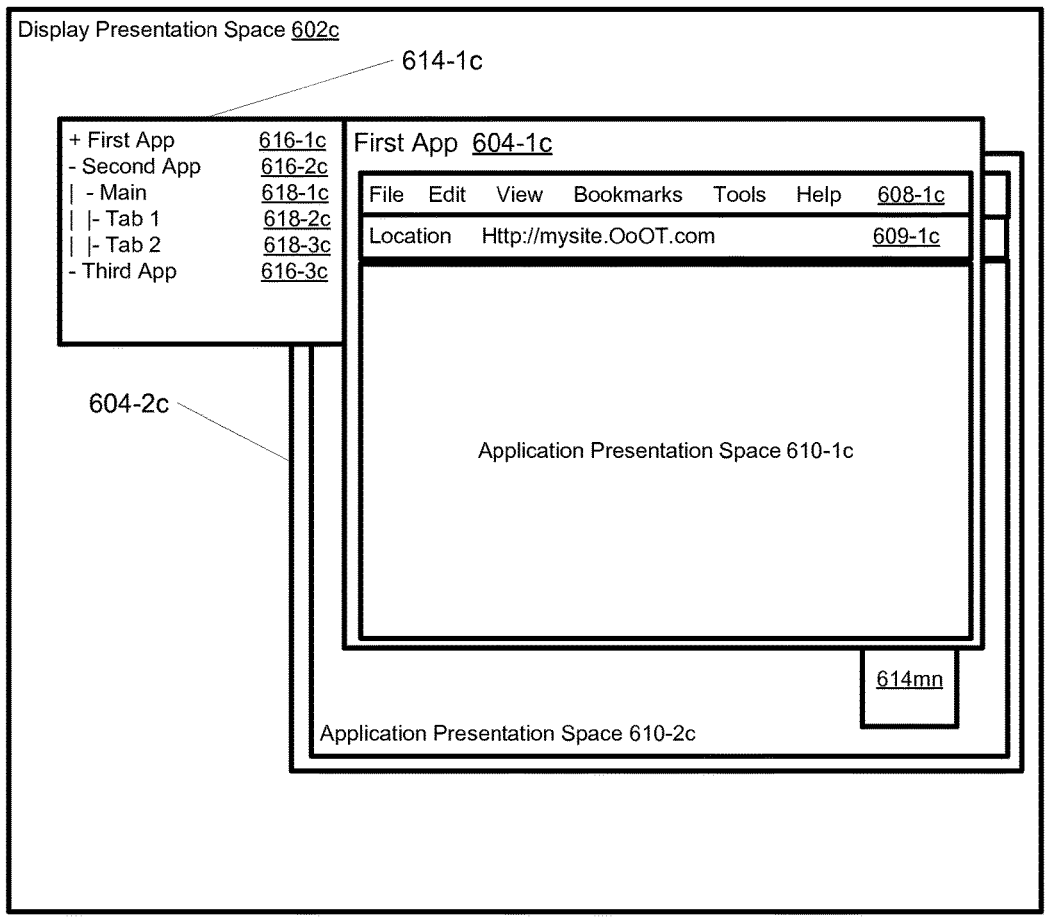
FIG. 6c is a diagram illustrating a user interface presented via a display according to another aspect of the subject matter described herein.
Figure 6D:
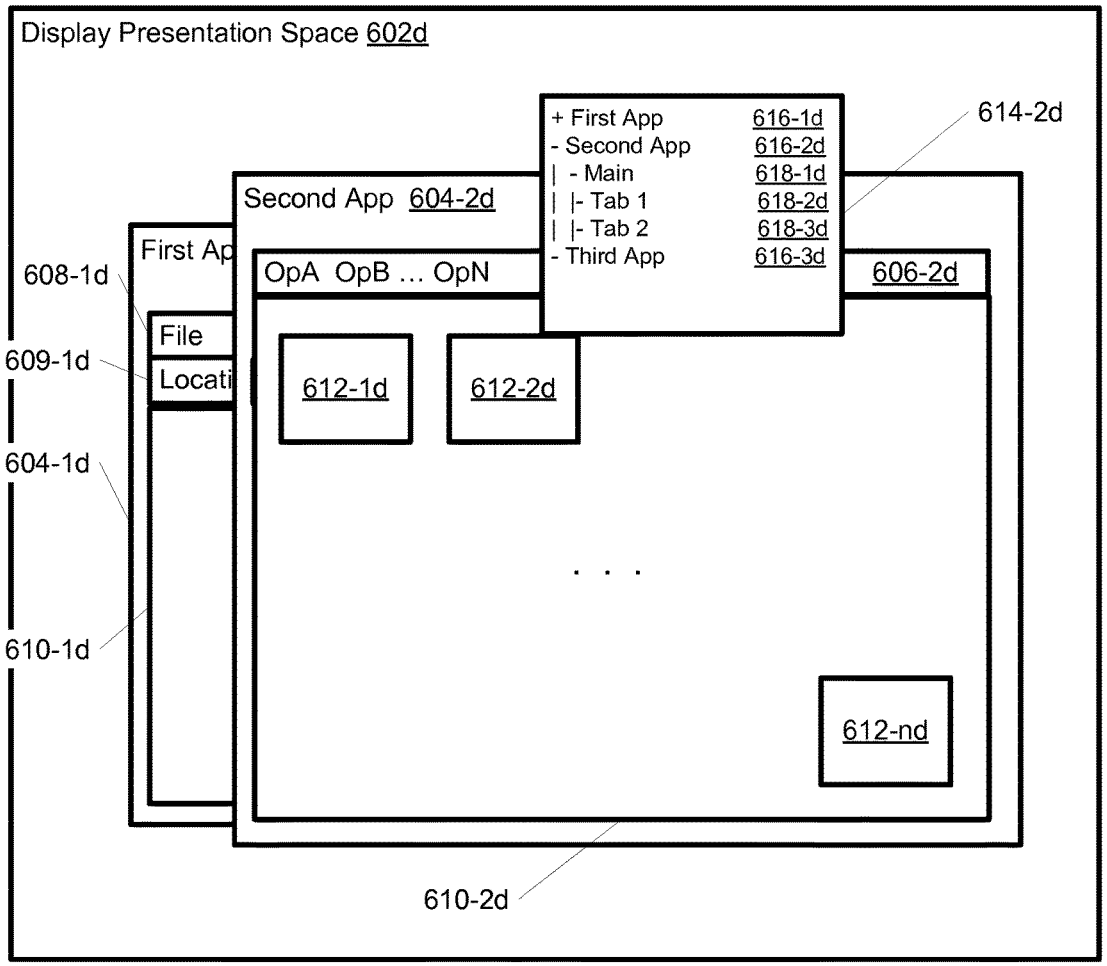
FIG. 6d is a diagram illustrating a user interface presented via a display according to another aspect of the subject matter described herein.

Returning to FIGS. 6a-e, first app 604-1a, 604-1b, 604-1c, 604-1d, 604-1e visual components and second app 604-2a, 604-2b, 604-2c, 604-2d, 604-2e visual components are collectively and generically are referred to as app(s) 604 visual components. App 604 visual components in FIGS. 6a-e illustrate a number of visual user interface elements commonly found in application user interfaces. Menu bars 608 are illustrated in first app 604-1 visual components in FIGS. 6a-e. Menu bars 608 are illustrated including menu controls for receiving user input to identify commands to perform. Location bars 609 are illustrated including universal resource locators (URLs) identifying sources of presented data. App 604 visual components also illustrate user interface elements providing respective application presentation spaces 610 for presenting content including other visual components illustrated by resource user interface elements 612-1d through 612-nd in FIG. 6d representing respective resources.

With reference to FIG. 2, block 202 illustrates that the method includes detecting, in a first application region of a presentation space of a display device, a first visual component of a first operating application in a plurality of operating applications. Accordingly, a system for navigating between visual components includes means for detecting, in a first application region of a presentation space of a display device, a first visual component of a first operating application in a plurality of operating applications. For example, as illustrated in FIG. 3, presentation space monitor component 302 is configured for detecting, in a first application region of a presentation space of a display device, a first visual component of a first operating application in a plurality of operating applications. FIGS. 4a-d illustrate presentation space monitor components 402 as adaptations and/or analogs of presentation space monitor component 302 in FIG. 3. One or more presentation space monitor components 402 operate in execution environments 401.

In FIG. 4a, PS monitor component 402a is illustrated as a component of application 403a. In FIG. 4b, PS monitor component 402b is illustrated as a component of network application agent 405b. In FIG. 4c, PS monitor component 402c is illustrated operating external to one or more applications 403c. Execution environment 401c includes PS monitor component 402c in GUI subsystem 437c. In FIG. 4d, PS monitor component 402d is illustrated operating in network application 403d remote from a display device for presenting and/or updating a visual component. For example, PS monitor component 402 may operate in application provider node 506 while a visual component is presented via a display device of user node 502 based on presentation information sent via network 504 from application provider node 506.

A visual component may be detected by one or more of receiving a request to present the visual component, receiving a request for a resource for presenting the visual component, detecting a change in at least a portion of a presentation space, intercepting a communication identifying the visual component, receiving an input corresponding to the visual component, receiving a notification identifying the visual component, and sending presentation information to present at least a portion of the visual component.

In FIG. 4a, PS monitor 402a may receive a request to present a visual component, such as app 604 visual component in any of FIGS. 6a-e. PS monitor component 402a may be configured to intercept and/or otherwise mediate access to one or more UI element handler components 433a for presenting the app 604 visual component and/or other visual components of application 403a. PS monitor component 402a may send presentation information and/or information for generating presentation information to a UI element handler component 433a for presenting some or all of a visual component via a display device.

In FIG. 4b, PS monitor component 402b may receive, intercept, and/or otherwise mediate processing of a request for a resource for presenting a visual component such as a browser tab, a browser window of browser 403b, and/or content received from network application 403d in FIG. 4d operating in application provider node 506. Content from network application 403d may include network application agent 405b and/or content retrieved by network application agent 405b. PS monitor component 402b may be a component of browser 403b. Alternatively or additionally, a PS monitor component 402 may operate as a component of network application agent 405b and/or a component of network application 403d as illustrated by PS monitor component 402d.

PS monitor component 402c in FIG. 4c may track and/or otherwise monitor at least some changes to a presentation space accessible to GUI subsystem 437c. FIGS. 6a-e illustrate various display presentation spaces 602 and application presentation spaces 610 as exemplary presentation spaces. A change to a presentation space may include presenting a visual component via the presentation space, updating a visual component in the presentation space, and/or removing a visual component from the presentation space. A change may be in response to a user input. PS monitor component 402c may receive and/or otherwise monitor user input received for a visual component. In an aspect, PS monitor component 402c may receive change information by accessing a log maintained by GUI subsystem 437c and/or graphics subsystem 439c. The log may be accessed via receiving notifications of log entries.

As described above, a visual component may be detected by an application presenting some or all of the visual component, by a remote node, and/or by a component operating external to an application that presents some or all of the visual component.

In detecting and/or otherwise monitoring a visual component, a PS monitor component 402 may identify a region in a presentation space that includes the visual component. The region is referred to herein as an "application region". As illustrated in FIGS. 6a-e a visual component may be included in a plurality of visual components in a presentation space. The visual components may be included in user interfaces of a plurality of operating applications.

Returning to FIG. 2, block 204 illustrates that the method further includes presenting a first navigation control, in a first navigation region determined based on the first application region, for navigating to a second visual component, of a second application in the plurality, in a second application region in the presentation space. Accordingly, a system for navigating between visual components includes means for presenting a first navigation control, in a first navigation region determined based on the first application region, for navigating to a second visual component, of a second application in the plurality, in a second application region in the presentation space. For example, as illustrated in FIG. 3, application navigator component 304 is configured for presenting a first navigation control, in a first navigation region determined based on the first application region, for navigating to a second visual component, of a second application in the plurality, in a second application region in the presentation space. FIGS. 4a-d illustrate application navigator components 404 as adaptations and/or analogs of application navigator component 304 in FIG. 3. One or more application navigator components 404 operate in execution environments 401.

A navigation control is a user interface element for navigating between and/or among user interface elements of respective operating applications. The user interface elements may be visual components. A navigation control may include and/or have an application control representing a particular application. An application control may include and/or have a visual component control representing a particular visual component in the application represented by the application control. An input received corresponding to a particular application control may identify a user instruction to navigate to a visual component of the particular application. A user input corresponding to a particular visual component control may identify a user instruction to navigate to a particular visual component in a particular application corresponding to an application control that includes and/or otherwise has the visual component control.

FIGS. 6a-e illustrate various navigation control 614 visual components. Second navigation control 614-2a illustrates a user interface element that is a parent of second app 604-2a visual component. Navigation control 614-2a includes and illustrates first application control 616-1a, second application control 616-2a, and third application control 616-3a. First app 604-1a visual component may be included in a user interface for a first application, second app 604-2a visual component may be included in a user interface for a second application, and a third app visual component (not shown) may be included in a user interface for a third application.

A navigation control may be automatically presented in response to presenting of a corresponding visual component in a user interface of an operating application. For example, as described, second navigation control 614-2a includes second app 604-2a visual component of a second application. In FIG. 4c, GUI subsystem 437c may receive presentation information for presenting second app 604-2a visual component. GUI subsystem 437c may invoke application navigator component 404c. Application navigator component 404c may provide a presentation space for presenting second app 604-2a visual component in second navigation control 614-2a by instructing navigation element handler component 406c to present second navigation control 614-2a in display presentation space 602a.

In another aspect, a navigation control may be presented in response to a navigation-activate input received from a user via an input device. For example, first app 604-1b visual component in FIG. 6b may be presented by browser 403b in FIG. 4b. First navigation control 614-1b may be non-existent and/or hidden until a navigation-activate input is received by application navigator component 404b via a UI element handler component 433b. The input may be a hotkey, a touch in a designated location of a touch screen, and/or a mouse gesture defined as a navigation-activate input. Alternatively or additionally, a pointer user interface element presented within a specified distance of, for example, the top, right corner of first app 604-1b visual component may be detected as a navigation-activate input. A navigation-activate input may be defined by a particular application such as application 403a in FIG. 4a and/or browser 403b in FIG. 4b. In another aspect, a navigation-activate input may be defined for an execution environment. For example GUI subsystem 437c may include and/or otherwise access configuration information defining a navigation-activate input for applications operating in execution environment 401c. Further, a navigation-activate input may be defined and/or detected by a node remote from a node detecting the input. Application navigator component 404d and navigation element handler component 406d operating in application provider node 506 may define and/or may detect a navigation-activate input via browser 403b and/or network application agent 405b operating in user node 502.

Figure 6E:
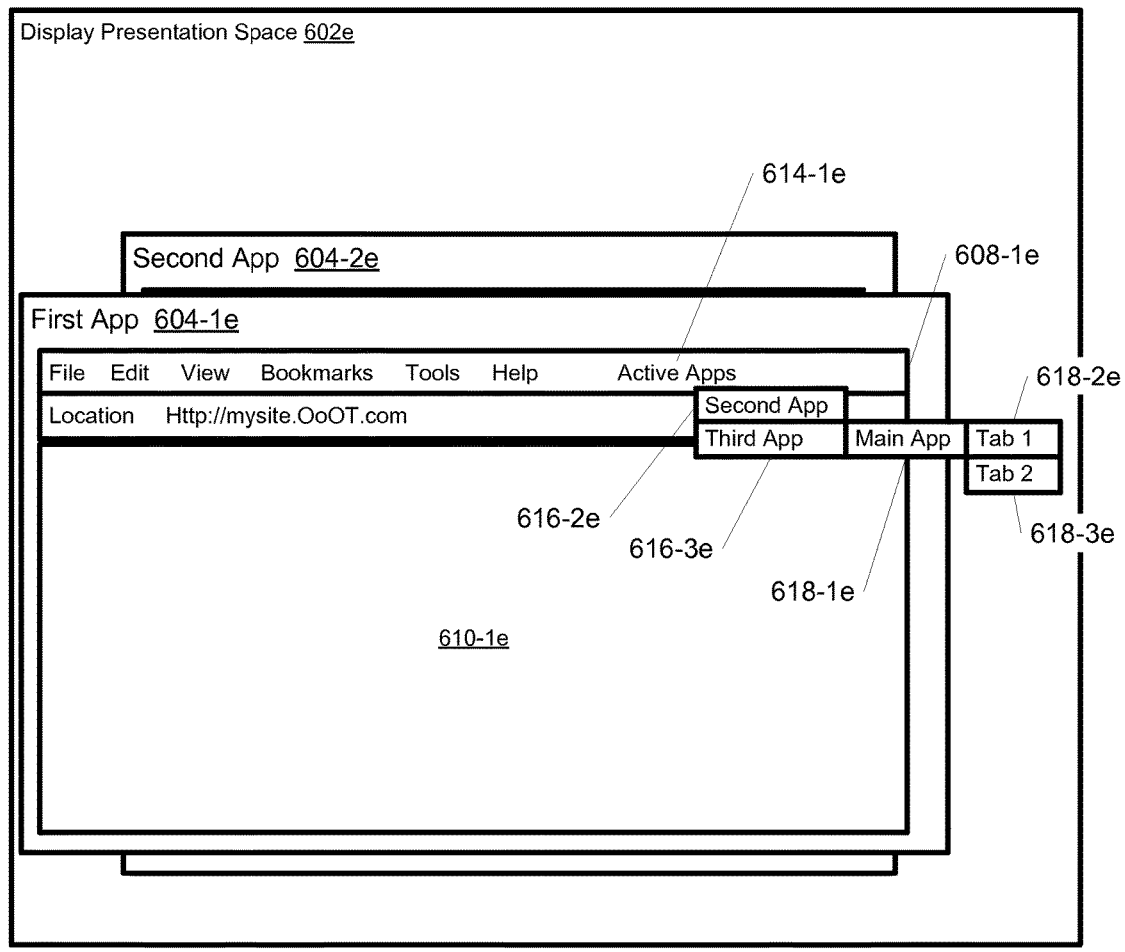
FIG. 6e is a diagram illustrating a user interface presented via a display according to another aspect of the subject matter described herein.

An application navigator component 404 may determine and/or otherwise identify a region, in a presentation space, to present a navigation control 614. The navigation region may be determined based on an application region as described above. A region including a navigation control is referred to herein as a "navigation region". As illustrated in FIGS. 6a-e, a navigation region may be determined based on an application region in various ways. FIG. 6a illustrates navigation control 614-2a in a navigation region that includes the application region of second app 604-2a visual component. FIG. 6b illustrates navigation control 614-1b in a navigation region determined based on the top, right corner of the application region for first app 604-1b visual component. FIG. 6c illustrates navigation control 614-1c in a navigation region based on a portion of a left border of the application region that includes first app 604-1c visual component. FIG. 6d illustrates navigation control 614-2d in a navigation region as a pop-up or context pane where the navigation region may be determined based on a location corresponding to an input detected in the application region including second app 604-2d visual component. FIG. 6e illustrates navigation control 614-1e in a navigation region bound to menu bar 608-1e in the application region that includes first app 604-1e visual component.

Returning to FIG. 2, block 206 illustrates that the method yet further includes detecting a user input corresponding to the first navigation control. Accordingly, a system for navigating between visual components includes means for detecting a user input corresponding to the first navigation control. For example, as illustrated in FIG. 3, navigation element handler component 306 is configured for detecting a user input corresponding to the first navigation control. FIGS. 4a-d illustrate navigation element handler component 406 as adaptations and/or analogs of navigation element handler component 306 in FIG. 3. One or more navigation element handler components 406 operate in execution environments 401.

In an aspect, an input may be detected by a navigation element handler component 406 in FIGS. 4a-d. The navigation element handler component 406 may determine a second visual component based on an ordering of applications and/or their respective visual components maintained by a corresponding application navigation component 404.

For example, an ordering may be based on a z-level of visual components, a priority assigned to an application process providing a context for an operating application, a priority and/or other attribute of a thread in an application process, and/or a user-specified ordering. In an aspect, a navigation element handler component 406 and/or an application navigation component 404b may identify an application and/or a visual component of an application randomly. For example, applications and/or visual components may be assigned numbers and a random number generator may be invoked to identify an application and/or visual component identified by a number generated by the random number generator.

Detecting a user input corresponding to a navigation control may include detecting the user input corresponding to an application control included in and/or otherwise associated with the navigation control. A navigation control may include one or more application controls corresponding to one or more respective applications. In another aspect, an application control corresponding to a particular application may be included in a navigation control. A user input may be detected corresponding to a particular application control in a navigation control. The application control identifies an application. A navigation element handler component 406 may interoperate with an application navigation component 404 to identify a visual component of the application 403, such as the application's main window, a visual component most recently updated, and/or a visual component assigned input focus for an input device.

Detecting a user input corresponding to a navigation control may include detecting the user input corresponding to a visual component control included in and/or otherwise associated with the navigation control. A visual component control may be included in and/or otherwise associated with an application control corresponding to an application of a visual component corresponding to the visual component control. A navigation control and/or an application control may include one or more visual component controls corresponding to one or more respective visual components. A visual component control may be included in an application control, corresponding to a particular application, included in a navigation control. A user input may be detected corresponding to a particular visual component control in a navigation control. The visual component control identifies a particular visual component in a particular application. A navigation element handler component 406 may interoperate with an application navigation component 404 to identify the visual component of the application.

A navigation element handler component 406 may determine and/or otherwise detect an input corresponding to a navigation control 614. As illustrated in FIGS. 6a-e, a navigation control may be presented in various ways. A navigation control as illustrated in FIGS. 6a-e may include an application control 616 and/or a visual component control 618.

FIG. 6a illustrates first application control 616-1a, second application control 616-2a, and third application control 616-3a in second application control 614-2a. FIG. 6b illustrates first application control 616-1b, second application control 616-2b, and third application control 616-3b as menu items and/or submenus in navigation control 614-1b presented as a menu. FIG. 6c illustrates first application control 616-1c, second application control 616-2c, and third application control 616-3c as first level nodes in navigation control 614-1c presented as a tree view user interface control. FIG. 6c also illustrates three visual component controls 618-1c, 618-2c, 618-3c as child nodes of second application control 616-2c. FIG. 6d illustrates first application control 616-1d, second application control 616-2d, and third application control 616-3d as first level nodes in navigation control 614-2d presented as a tree view context user interface control. FIG. 6d also illustrates three visual component controls 618-1d, 618-2d, 618-3d as child nodes of second application control 616-2d. FIG. 6e illustrates no application control for first app 604-1e visual component. FIG. 6e illustrates second application control 616-2e and third application control 616-3e as menu items and/or submenus in navigation control 614-1e. FIG. 6e also illustrates three visual component controls 618-1e, 618-2e, 618-3e as a child menu items of third application control 616-3e.

An application navigation component 404 may invoke one or more navigation element handler components 406 to present and/or detect input for respective application controls and/or visual component controls.

Returning to FIG. 2, block 208 illustrates that the method yet further includes sending, in response to detecting the user input, navigation information to navigate to the second visual component. Accordingly, a system for navigating between visual components includes means for sending, in response to detecting the user input, navigation information to navigate to the second visual component. For example, as illustrated in FIG. 3, navigation director component 308 is configured for sending, in response to detecting the user input, navigation information to navigate to the second visual component. FIGS. 4a-d illustrate navigation director components 408 as adaptations and/or analogs of navigation director component 308 in FIG. 3. One or more navigation director components 408 operate in execution environments 401.

Sending the navigation information may include sending the navigation information by invoking a function, a method, and/or a subroutine. Sending the navigation information may include sending the navigation information by sending a message via a network. The message may be sent asynchronously. The message, in another aspect, may be included in a request/response exchange. Sending the navigation information may include sending the navigation information by sending data via an inter-process communication (IPC) including, for example, a message queue, a pipe, an interrupt, a semaphore, and/or a lock. Sending the navigation information may include sending the navigation information via a shared data area.

Navigation information may include information for changing an attribute of a visual component. For example, a z-order attribute, an input focus attribute, a size attribute, a location attribute, a font, a color, and/or a transparency level may be changed based on navigation information for a visual component being navigated to and/or a visual component being navigated from.

In FIG. 4a, navigation director component 408a may send navigation information to a specified message queue in execution environment 401a. Applications operating in execution environment 401a may subscribe to and/or poll the message queue to receive a navigation instruction. Navigation information may identify a visual component and/or an application to navigate to. An identified application may determine a visual component to navigate to if a visual component of the application is not identified by the navigation information.

In FIG. 6a, first app 604-1a visual component may be included in a user interface for application 403a in execution environment 401a. An input corresponding to second application control 616-2a may be detected by navigation element handler component 406a. Navigation element handler component 406*a*, application navigation component 404*a*, and/or navigation director component 408*a* may generate navigation information based on second application control 616-2*a*. Navigation director component 408*a* may post the navigation information to a message queue, write the navigation information to a pipe configured for exchanging navigation information between and/or among applications, and/or store the navigation information in a shared data area accessible to other applications in execution environment 401*a*. A second application may receive the navigation information and determine that the navigation information identifies the second application. The second application may update second app 604-2*a* visual component, for example, so that it is presented on top of first app 604-1*a* visual component as shown in FIG. 6*a*. The second application may determine a visual component of a user interface of second application to which to navigate. The determination may be user configurable and/or determined by execution environment 401*a*.

In FIG. 4*b*, navigation director component 408*b* may operate as described above. Alternatively or additionally, navigation director component 408*b* operating in user node 502 may send a message via network 504 to a remote node, such as application provider node 506. Network application 403*d* may provide a subscription service. Navigation director component 408*b* may send navigation information to a specified publish-subscribe tuple and/or service. Applications operating in execution environment 401*a* may subscribe to and/or poll the tuple and/or service to receive navigation information. Navigation information may identify a visual component and/or an application to navigate to. An identified application may determine a visual component to navigate to if a visual component of the application is not identified by the navigation information. In FIG. 6*b*, first app 604-1*b* visual component may be included in a user interface for browser 403*b* in execution environment 401*b*. An input corresponding to first visual component control 618-1*b* associated with third application control 616-3*b* as illustrated may be detected by navigation element handler component 406*b*. Navigation element handler component 406*b*, application navigation component 404*b*, and/or navigation director component 408*b* may generate navigation information based on first visual component control 618-1*b*. Navigation director component 408*b* may post the navigation information via an asynchronous message to the specified tuple and/or service. The tuple and/or service may be accessible to other applications in execution environment 401*b* via a subscription and/or via polling for navigation information.

A second application may receive the navigation information and determine that the navigation information identifies a third application. The second application may ignore the navigation information or may change an attribute of a visual component in a user interface of the second application in accordance with the instruction to navigate to the identified visual component of the third application. The third application may update a third app visual component. The third app visual component may be minimized prior to processing the navigation instruction, may be hidden behind another visual component, and/or may otherwise not be visible to a user. The third application may present the visual component identified by visual component control 618-1*b* according to the navigation instruction represented in and/or by the navigation information.

In an aspect, an input detected corresponding to a navigation control may be communicated by user node 502 to network application 403*d* operating in application provider node 506. The input information may be received by navigation element handler component 406*d*. The navigation control presented by user node 502 may be presented based on presented information provided by application navigation component 404*d* based on visual components detected by PS monitor component 402*d* interoperating with user node 502. Navigation director component 408*d* may send the navigation information to any number of requesting and/or otherwise identified client nodes, such as user node 502. In another aspect, navigation director component 408*d* may determine a node to receive the navigation information. Navigation director component 408*d* may send the navigation information to the node identified by the determination. Navigation director component 408*d* may send the navigation information in an unsolicited message via an asynchronous message and/or may send the navigation information in response to a request from the identified node.

In FIG. 4*c*, navigation director component 408*c* may send navigation information by invoking a function, method, subroutine, and/or other addressable instruction in an application identified based on the detected input corresponding to a navigation control. Applications operating in execution environment 401*c* may register an invocation point with GUI subsystem 437*c*. Registration may be explicit and/or implicit in an interoperation between an application 403*c* and GUI subsystem 437*c*. Navigation information may identify a visual component and/or an application to navigate to. An identified application may determine a visual component to navigate to if a visual component of the application is not identified by the navigation information. In FIG. 6*c*, first app 604-1*c* visual component may be included in a user interface for an application 403-1*c* in execution environment 401*c*. An input corresponding to second application control 616-2*c* may be detected by navigation element handler component 406*c*. Navigation element handler component 406*c*, application navigation component 404*c*, and/or navigation director component 408*c* may generate navigation information based on second application control 616-2*c*. Navigation director component 408*c* may invoke second application 403-2*c* providing access to the navigation information via the invocation. Second application 403-2*c* may receive the navigation information and determine a visual component to navigate to if one is not identified in the navigation information. The second application may update second app 604-2*c* visual component by moving it from behind first app 604-1*c* visual component.

In another aspect, navigation director component 408*c* may invoke first application 403-1*c*, instructing first application 403-1*c* to change a transparency level of first app 604-1*c* visual component allowing second app 604-2*c* visual component to be visible to a user. Navigation director component 408*c* may assign input focus for one or more input devices to the visual component of second application 403-2*c* so that input from the one or more input devices is routed to second application 403-2*c* and corresponds to the visual component according to the navigation instruction of the navigation information. In various aspects, one or both of first application 403-1*c* and second application 403-2*c* may be sent navigation information. In another aspect, neither first application 403-1*c* nor second application 403-2*c* may be sent navigation information. Rather, navigation information may be sent to a component of GUI subsystem 437*c*. For example, GUI subsystem 437*c* may change the transparency level of first app 604-1*c* visual component and assign input focus to second app 604-2*c* visual component in navigating to second app 604-2*c* visual component.

As described above, in response to navigating to a visual component, a navigation control, in a navigation region determined based on the application region of the visual component, may be presented for navigating from the visual component to another visual component. Thus some or all visual components of some or all operating applications in an execution environment may be presented with a navigation control for navigating to another visual component of the same and/or of a different application.

The method illustrated in FIG. 2 may include additional aspects supported by various adaptations and/or analogs of the arrangement of components in FIG. 3. In various aspects, a visual component may be included in and/or may include window, a dialog box, a textbox, a check box, a radio button, a slider, a list box, a drop-down list, a spinner, a menu, a menu item, a toolbar, a ribbon, a combo box, a tree view, a grid view, a navigation tab, a scrollbar, a label, a tooltip, a balloon, a slide-out control, a pop-up, a pop-over, a pop-under, and a sidebar, to name a few examples.

A first application presenting a first visual component may operate in a first process in an execution environment and a second application presenting a second visual component may operate in a second process in the execution environment. Further, the first and second application may be generated from different source code. The first application may be represented in a processor memory by at least a portion of a first program generated from first source code and the second application may be represented in a processor memory by at least a portion of a second program generated from second source code Detecting a visual component may include detecting a measure of visibility of the first visual component to a user. A measure of visibility may be based on at least one of a z-order, an attribute of a font, a size, a location in the presentation space, a transparency attribute, and/or a size of a visible portion of a visual component. For example, in FIG. 4c PS monitor component 402c may receive information identifying a measure of visibility for any visual component processed by GUI subsystem 437c.

A navigation control for a visual component may be presented in response to a change detected in a visually detectable attribute of the visual component. For example, an application navigator component 404 in FIGS. 4a-d may be configured to hide a navigation control 614 in response to maximizing a corresponding app 604 visual component in a user interface of an application 403. When the app 604 visual component is restored to its non-maximized state, the application navigation component 404 may present a navigation control 614 for the app 604 visual component. The navigation control 614 may be presented automatically in response to an input and/or other instruction to present the app 604 visual component in its normal state, neither minimized nor maximized.

A navigation region may be determined based on a location of a visual component, a parent visual component of the visual component, and a child visual component of the visual component. For example, in FIG. 6a an application navigation component 404 in FIGS. 4a-d may determine a navigation region for second navigation control 614-2a where second navigation control 614-2a is a parent of second app 604-2a visual component and includes an application region of the visual component, second app 604-2a. FIG. 6b illustrates that an application navigation component 404 may determine a navigation region including navigation control 614-1b where the navigation region is adjacent to the application region of first app 604-1b visual component. FIG. 6e illustrates that an application navigation component 404 may determine a navigation region based on menu bar 608-1e included as a child visual component in first app 604-1e visual component.

A navigation region may be determined based on a border of a visual component, a parent visual component of the visual component, and a child visual component of the visual component. FIG. 6b and FIG. 6c illustrate navigation regions for navigation control 614-1b and navigation control 614-1c respectively determined based on a border of first app 604-1b visual component and first app 604-1c visual component. FIG. 6b and FIG. 6c further illustrate that a navigation region may share a border with an associated application region, may be at least partially included in the application region, and may be outside the application region.

In an aspect, a control and/or an associated visual component may be at least partially transparent. A transparency attribute of the control and/or the visual component may be responsive to a change in a position of a visual representation of an input pointer, a change in an input focus attribute associated with at least one of the control and the visual component, and/or a transparency attribute of the respective visual component and/or the control. A navigation element handler component 406 in FIGS. 4a-d may be configured to manage the transparency of a control and may further interoperate with a UI element handler component 433 and/or a graphics subsystem 439a, 439b, 439c to manage transparency of a corresponding visual component.

Presenting a navigation control may include detecting the navigation control presented in a previous navigation region determined based on a corresponding application region. Presenting may further include detecting a move indication (in response to a detected user input), and determining the navigation region based on at least one of a current application region and the previous navigation region. A navigation region may be determined based on the move indication. Further, presenting the navigation control may include determining that a corresponding application region differs from a previous application region in the presentation space, which includes a visual component that corresponded to the navigation region prior to the presenting. Presenting may further include presenting the navigation control in the navigation region from a previous navigation region determined based on the previous application region.

For example, an application navigation component 404 and/or a navigation element handler component 406 may be configured to minimize movement of a navigation control 614 and present the navigation control 614 along a border of a corresponding visual component. When the visual component is moved and/or resized, the application navigation component 404 and/or a navigation element handler component 406 determine a navigation region to include the moved and/or resized navigation control 614 based on the previous navigation region and based on the new application region. Alternatively or additionally, a first input may indicate that a navigation control is to be presented adjacent to a first border of a visual component and a second input may indicate that the navigation control is to be presented as a child visual component of the visual component.

As described above, an application control and/or a visual component control may be included in and/or activated for receiving input based on a state of a corresponding application and/or a state of a visual component of the corresponding application. A state may indicate that an application and/or a visual component is minimized, hidden, partially hidden, suspended, blocked, and/or that access is not authorized.

An application control and/or a visual component control may be presented in a plurality including at least one of a plurality of application controls and a plurality of visual component controls based on a specified order of at least one of a plurality of applications corresponding to the plurality of application controls and a plurality of visual components corresponding to the plurality of visual component controls. A specified order may be based on a time attribute, an application identifier, a z-order attribute, a size attribute, a color attribute, a font, a state of a process context for an application, a state of a thread context in the process context, and/or a user-assigned order.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction-processing units, or by a combination of both. The description herein of any sequence of actions is not intended to imply that the specific order described for performing that sequence must be followed.

Moreover, the methods described herein may be embodied in executable instructions stored in a computer-readable medium for use by or in connection with an instruction execution machine, system, apparatus, or device, such as a computer-based or processor-containing machine, system, apparatus, or device. As used here, a "computer-readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer-readable medium and execute the instructions for carrying out the described methods. A non-exhaustive list of conventional exemplary computer-readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), and a Blu-Ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. An apparatus, comprising:
   at least one processor;
   a display operatively coupled to the at least one processor;
   at least one input device operatively coupled to the at least one processor; and
   memory operatively coupled to the at least one processor;
   said memory operatively coupled to the at least one processor configured to store a plurality of applications including a first application and a second application;
   said display operatively coupled to the at least one processor configured to present, utilizing the at least one processor, a first visual component of the first application in the plurality of applications, in a first application region of a presentation space of the display;
   said at least one input device operatively coupled to the at least one processor configured to detect, utilizing the at least one processor, first user input in connection with the first visual component of the first application;
   said display operatively coupled to the at least one processor configured to, in response to the detection of the first user input in connection with the first visual component of the first application, present, utilizing the at least one processor, a representation of a second visual component of the second application in the plurality of applications, in a first control region of the presentation space of the display based on the first application region, for navigating to the second visual component of the second application, in a second application region in the presentation space of the display, the first control region being based on the first application region by being at a first location adjacent to a second location of the first visual component;
   said at least one input device operatively coupled to the at least one processor configured to detect, utilizing the at least one processor, second user input in connection with the representation of the second visual component of the second application in the plurality of applications;
   said display operatively coupled to the at least one processor configured to, in response to the detection of the second user input in connection with the representation of the second visual component of the second application in the plurality of applications, present, utilizing the at least one processor, the second visual component of the second application in the plurality of applications;

said display operatively coupled to the at least one processor configured to, in connection with the second visual component of the second application in the plurality of applications, present, utilizing the at least one processor, an area not including the representation of the second visual component and including a representation of a third visual component of a third application in the plurality of applications, in a second control region of the presentation space of the display based on a second application region of the presentation space of the display in which the second visual component of the second application is presented, for navigating to the third visual component of the third application, in a third application region in the presentation space of the display, the second control region being based on the second application region by being at a third location adjacent to a fourth location of the second visual component;

said at least one input device operatively coupled to the at least one processor configured to detect, utilizing the at least one processor, third user input in connection with the representation of the third visual component of the third application in the plurality of applications;

said display operatively coupled to the at least one processor configured to, in response to the detection of the third user input in connection with the representation of the third visual component of the third application in the plurality of applications, present, utilizing the at least one processor, the third visual component of the third application in the plurality of applications.

2. The apparatus of claim 1, wherein the apparatus is further configured to:
detect, utilizing the at least one processor, fourth user input in connection with the first visual component of the first application;
in response to the detection of the fourth user input in connection with the first visual component of the first application, moving, utilizing the at least one processor and the display, the second location of the first visual component of the first application, to a fifth location;
in response to the detection of the fourth user input in connection with the first visual component of the first application, moving, utilizing the at least one processor and the display, the representation of the second visual component of the second application in the plurality of applications to a sixth location adjacent to the fifth location.

3. The apparatus of claim 1, wherein the apparatus is configured to detect the first user input in connection with the first visual component of the first application, by detecting a gesture defined as a navigation-activate input in connection with a predetermined location of the presentation space of the display.

4. The apparatus of claim 1, wherein the apparatus is configured to detect the first user input in connection with the first visual component of the first application, by detecting an instruction that results in the first visual component of the first application being in a state that is neither minimized nor maximized.

5. The apparatus of claim 1, wherein the apparatus is configured to detect the first user input in connection with the first visual component of the first application, by detecting a movement that is predetermined to be an execution environment navigation-activate input for each of the plurality of applications of an execution environment including the plurality of applications.

6. The apparatus of claim 1, wherein the apparatus is configured to conditionally present the representation of the second visual component of the second application in the plurality of applications, based on whether the detected first user input includes a gesture defined as a navigation-activate input received on a predetermined top location of the first visual component and in a predetermined location of the presentation space of the display.

7. The apparatus of claim 1, wherein the apparatus is configured such that the representation of the second visual component of the second application is conditionally included, in response to the detection of the first user input in connection with the first visual component of the first application, based on a state of the second application.

8. The apparatus of claim 1, wherein the apparatus is configured such that the representation of the second visual component of the second application is conditionally included, in response to the detection of the first user input in connection with the first visual component of the first application, based on a state of a process or thread context of the second application.

9. The apparatus of claim 1, wherein the apparatus is configured such that the representation of the second visual component of the second application is conditionally included, in response to the detection of the first user input in connection with the first visual component of the first application, based on whether the second application is operating and at least one aspect that is based on a user input.

10. The apparatus of claim 1, wherein the apparatus is configured such that the first control region is based on the first application region by being at the first location which is to a side of the second location of the first visual component, such that the representation of the second visual component of the second application in the plurality of applications is presented outside the first visual component of the first application.

11. The apparatus of claim 1, wherein the apparatus is configured such that the second visual component of the second application in the plurality of applications is presented in addition to the first visual component of the first application in the plurality of applications, in response to the detection of the second user input.

12. The apparatus of claim 1, wherein the apparatus is configured such that the representation of the second visual component is presented at the first location adjacent to the second location of the first visual component, for allowing a user to view a state of the second application and select the second application among the plurality of applications such that the second visual component of the second application is capable of being presented along with the first visual component of the first application.

13. The apparatus of claim 1, wherein the apparatus is configured such that the representation of the second visual component of the second application in the plurality of applications is hidden, in response to the first visual component of the first application being maximized.

14. The apparatus of claim 1, wherein the apparatus is configured such that: the first visual component includes a first window, the second visual component includes a second window, and the third visual component includes a third window; the representation of the second window is one of a plurality of elements of a menu; the menu is presented if the first user input involves a top of the first window and a particular location of the presentation space of the display; the menu is presented in another area that is outside of the first window; the menu is moved as a function of a movement of the first window; the menu is re-sized as a function of a re-sizing of the first window; the another area is positioned at a first place with respect to the first window if the first user input includes a first particular input; the another area is positioned at a second place with respect to the first window if the first user input includes a second particular input; and the menu does not include the representation of the first window.

15. The apparatus of claim 14, wherein the apparatus is configured such that the first place and the second place are positioned adjacent to different sides of the first window.

16. The apparatus of claim 14, wherein the apparatus is configured such that the second window is updated prior to the presentation thereof.

17. The apparatus of claim 14, wherein the apparatus is configured such that the representation of the second window includes a particular window of the second application and an icon that identifies the second application.

18. The apparatus of claim 14, wherein the apparatus is configured such that the area and the another area are positioned, at least in part, in different regions and are of different sizes.

19. The apparatus of claim 14, wherein the apparatus is configured such that the area and the another area are positioned over different parts of a desktop.

20. The apparatus of claim 14, wherein the apparatus is configured such that the area and the another area overlap, at least in part.

21. The apparatus of claim 14, wherein the apparatus is configured such that positioned in the area is another menu version that excludes the representation of the second window as an element thereof.

22. The apparatus of claim 14, wherein the apparatus is configured such that the area includes another menu that does not include the representation of the second window, where the another menu is positioned at least partly in a different location and is of a different size with respect to the menu in the another area.

23. The apparatus of claim 14, wherein the apparatus is configured to present the area after the presentation of the second window of the second application in the plurality of applications.

24. The apparatus of claim 14, wherein the apparatus is configured to present the area in connection with the second window of the second application in the plurality of applications, by presenting the area in response to particular user input after the second user input, where the particular user input involves a top portion of the second window.

25. The apparatus of claim 14, wherein the apparatus is configured such that the area is presented in response to the detection of the second user input in connection with the representation of the second window of the second application in the plurality of applications.

26. The apparatus of claim 25, wherein the apparatus is configured such that the area is another instance of the menu.

27. The apparatus of claim 25, wherein the apparatus is configured such that the area includes the menu at least partly in a different location.

28. The apparatus of claim 25, wherein the apparatus is configured such that the area is another menu.

29. The apparatus of claim 14, wherein the apparatus is configured such that the first control region and the second control region each includes at least a first part that shares a same portion of the presentation space and at least a second part that occupies different portions of the presentation space.

30. The apparatus of claim 14, wherein the apparatus is configured such that the first location is adjacent to the second location by being positioned to the side of the second location.

31. The apparatus of claim 14, wherein the apparatus is configured such that the first location is adjacent to the second location such that the first control region resides at least in part over a desktop portion of the presentation space and does not overlap with the first window.

32. The apparatus of claim 14, wherein the apparatus is configured such that the menu does not include the representation of the first window when the first window has input focus.

33. The apparatus of claim 14, wherein the apparatus is configured such that the menu does not include the representation of the first window when the first window is already presented.

34. The apparatus of claim 14, wherein the apparatus is configured such that the menu is conditionally presented based on whether the first user input includes predetermined input that changes a size and a location of the first window.

35. The apparatus of claim 14, wherein the apparatus is configured such that the menu includes representations of different windows of a same application.

36. The apparatus of claim 14, wherein the apparatus is configured such that the menu is hidden if the first window is maximized.

37. The apparatus of claim 36, wherein the apparatus is configured such that the menu is re-presented if the first window is returned to a non-maximized state.

38. The apparatus of claim 14, wherein the apparatus is configured such that the menu is at least partially transparent.

39. The apparatus of claim 14, wherein the apparatus is configured such that the elements of the menu do not overlap.

40. The apparatus of claim 14, wherein the apparatus is configured such that the elements of the menu are organized in a grid.

41. The apparatus of claim 14, wherein the apparatus is configured such that the elements of the menu include separate thumbnails organized in a grid where the thumbnails and the first control region are both re-sized and moved.

42. The apparatus of claim 14, wherein the apparatus is configured such that the elements of the menu are each presented based on a z-order of a corresponding application.

43. The apparatus of claim 14, wherein the apparatus is configured such that an order of each of the elements of the menu is dynamically changed based on a state of a corresponding application.

44. The apparatus of claim 14, wherein the apparatus is configured such that an order of each of the elements of the menu is based on a z-order attribute of a corresponding application.

45. The apparatus of claim 14, wherein the apparatus is configured such that an order of the elements of the menu is each based on particular user input.

46. The apparatus of claim 14, wherein the apparatus is configured such that an order of the elements of the menu is each based on an attribute of a corresponding application that is a function of particular user input.

47. The apparatus of claim 46, wherein the apparatus is configured such that the particular user input includes a user-assignment of the order.

48. The apparatus of claim 47, wherein the apparatus is configured such that an order of each of the elements of the menu is based on a time attribute of a corresponding application.

49. The apparatus of claim 14, wherein the apparatus is configured such that an order of each of the elements of the menu is based on a state of a process context of a corresponding application.

50. The apparatus of claim 14, wherein the apparatus is configured such that an order of each of the elements of the menu is based on a state of a thread context of a corresponding application.

51. The apparatus of claim 14, wherein the apparatus is configured such that each of the plurality of applications is assigned a number that is capable of being utilized in connection with at least one of the first control region or the second control region.

52. The apparatus of claim 14, wherein the apparatus is configured such that the representation of the second window and the representation of the third window are presented in different menu versions.

53. The apparatus of claim 14, wherein the apparatus is configured such that the representation of the second window includes representations of a plurality of visual interface elements of the second window, and the representation of the third window includes representations of a plurality of visual interface elements of the third window.

54. The apparatus of claim 14, wherein the apparatus is configured such that the menu does not include the representation of the first window when the first window is presented.

55. The apparatus of claim 14, wherein the apparatus is configured such that the first user input involving the top of the first window and the particular location of the presentation space of the display is predetermined for an execution environment to cause the menu to be presented.

56. The apparatus of claim 14, wherein the apparatus is configured such that the menu is presented if the first user input involves the top of the first window and the particular location of the presentation space of the display, so as to move and re-size the first window such that the first window is not maximized and not minimized.

57. The apparatus of claim 14, wherein the apparatus is configured such that the menu is also presented in response to fourth user input involving a hot key.

58. The apparatus of claim 14, wherein the apparatus is configured such that the first user input takes the form of a predetermined navigation-activate input that changes a visibility of the first window.

59. The apparatus of claim 14, wherein the apparatus is configured such that the first user input takes the form of a predetermined navigation-activate input that changes an input focus associated with the first window.

60. The apparatus of claim 14, wherein the apparatus is configured such that the menu is presented in the another area that is outside of the first window and is further moved and re-sized, all for overlaying empty desktop space, that changes as a function of the movement and the re-sizing of the first window and is otherwise utilized for displaying different windows of the applications, to simultaneously provide a user a view of a state of the second application and an unobstructed view of an entirety of the first window.

61. The apparatus of claim 14, wherein the apparatus is configured such that the presentation, the movement, and the resizing of the menu avoids a problem of locating a desired window.

62. The apparatus of claim 14, wherein the apparatus is configured such that the menu:
  is presented outside of the first window,
  is moved and re-sized as a function of the movement and the re-sizing of the first window, and
  includes an organized array of representations that each reflect a state of at least one of the applications except the first application,
all for overlaying only empty desktop space so as to permit convenient selection and navigation of presentation and input focus to at least one window of at least one of the applications from the organized array based on the state, instead of requiring a user to locate the at least one window among a clutter of different windows and instead of using a desktop task bar, all while presenting an unobstructed view of both the organized array and the first window regardless of the movement and re-sizing of the menu and the first window.

63. The apparatus of claim 14, wherein the apparatus is configured such that the menu:
  is presented outside of the first window,
  is moved and re-sized as a function of the movement and the re-sizing of the first window, and
  includes an organized array of representations of corresponding applications except the first window,
all for permitting navigation to at least one window of at least one of the applications utilizing the organized array instead of requiring a user to locate the at least one window among a clutter of different windows, all while presenting an unobstructed view of both the organized array and the first window regardless of the movement and re-sizing of the menu and the first window.

64. The apparatus of claim 14, wherein the apparatus is configured such that the menu:
  is presented outside of the first window,
  is moved and re-sized as a function of the movement and the re-sizing of the first window, and
  includes an organized array of representations that each reflect a state of at least one of the applications except the first application,
all for permitting navigation to at least one window of at least one of the applications utilizing the organized array, instead of requiring a user to locate the at least one window among a clutter of different windows, all while presenting an unobstructed view of both the organized array and the first window regardless of the movement and re-sizing of the menu and the first window.

65. The apparatus of claim 14, wherein the apparatus is configured such that the presentation, the movement, and the resizing of the menu requires less non-productive input.

66. The apparatus of claim 14, wherein the apparatus is configured such that the at least one processor executes one or more instructions included in a presentation space monitor component, an application navigator component, a navigation element handler component, and a navigation director component, the presentation space monitor component configured for receiving the first user input, the application navigator component configured for sending presentation information to a graphical user interface subsystem which, in turn, sends corresponding instructions to a graphics subsystem that results in the display of each of the elements of the menu and further effects the movement and re-sizing of the menu and the elements thereof based on the movement and re-sizing of the first window, the navigation element handler component configured for receiving the second user input and the third user input, and the navigation director component configured for sending additional presentation information to the graphical user interface subsystem which, in turn, sends corresponding instructions to the graphics subsystem that results in the display of each of the second window and the third window.

67. The apparatus of claim 14, wherein the apparatus is configured such that the first window, the second window, and the third window are each included in the presentation space via a first virtual presentation space of the presentation space of the display.

68. The apparatus of claim 67, wherein the apparatus is configured to further include a second virtual presentation space of the presentation space of the display that includes another first window, another second window, and another third window.

69. The apparatus of claim 68, wherein the apparatus is configured to further include a third virtual presentation space of the presentation space of the display that includes yet another first window, yet another second window, and yet another third window.

70. The apparatus of claim 68, wherein the apparatus is configured such that display is a single display, and the first virtual presentation space and the second virtual presentation space are each separate single virtual presentation spaces.

71. The apparatus of claim 68, wherein the apparatus is configured such that the first virtual presentation space includes a first virtual desktop and the second virtual presentation space includes a second virtual desktop.

72. The apparatus of claim 68, wherein the apparatus is configured such that the second virtual presentation space of the presentation space of the display includes another menu that differs from the menu with respect to at least one aspect.

73. The apparatus of claim 72, wherein the apparatus is configured such that the at least one aspect includes a number of application-specific visual elements included therewith.

74. The apparatus of claim 72, wherein the apparatus is configured such that the at least one aspect includes an order of application-specific visual elements included therewith.

75. The apparatus of claim 72, wherein the apparatus is configured such that the at least one aspect includes a menu position.

76. The apparatus of claim 67, wherein the apparatus is configured to further include a second virtual presentation space of the presentation space of the display that is capable of including at least one of the first window, the second window, or the third window.

77. The apparatus of claim 76, wherein the apparatus is configured to further include a third virtual presentation space of the presentation space of the display that is capable of including at least one of the first window, the second window, or the third window.

78. The apparatus of claim 76, wherein the apparatus is configured such that display is a single display, and the first virtual presentation space and the second virtual presentation space are each separate single virtual presentation spaces.

79. The apparatus of claim 76, wherein the apparatus is configured such that the first virtual presentation space includes a first virtual desktop and the second virtual presentation space includes a second virtual desktop.

80. The apparatus of claim 76, wherein the apparatus is configured such that the second virtual presentation space of the presentation space of the display includes another menu version that differs from the menu with respect to at least one aspect.

81. The apparatus of claim 80, wherein the apparatus is configured such that the at least one aspect includes a number of application-specific visual elements included therewith.

82. The apparatus of claim 80, wherein the apparatus is configured such that the at least one aspect includes an order of application-specific visual elements included therewith.

83. The apparatus of claim 80, wherein the apparatus is configured such that the at least one aspect includes a menu position.

84. The apparatus of claim 76, wherein the apparatus is configured for allowing a user to navigate among different windows associated with different virtual presentation spaces.

85. The apparatus of claim 14, wherein the apparatus is configured such that:
the first window, the second window, and the third window are each included in the presentation space via a first single virtual presentation space of the presentation space of the display which includes a single display;
the apparatus further comprises:
a second single virtual presentation space of the presentation space of the single display that includes another first window, another second window, and another third window, and
a third single virtual presentation space of the presentation space of the single display that includes yet another first window, yet another second window, and yet another third window; and
the second single virtual presentation space and the third single virtual presentation space each include additional menu versions that differ from the menu of the first single virtual presentation space with respect to a number and an order of application-specific visual elements included therewith.

86. The apparatus of claim 85, wherein the apparatus is configured for allowing a user to navigate among different windows associated with different virtual presentation spaces.

87. The apparatus of claim 14, wherein the apparatus is configured such that:
the first window, the second window, and the third window are each included in the presentation space via a first virtual desktop of the presentation space of the display which includes a single display;
the apparatus capable of further comprising:
a second virtual desktop of the presentation space of the single display that includes at least one of the first window, the second window, or the third window; and
a third virtual desktop of the presentation space of the single display that includes at least one of the first window, the second window, or the third window;
the first virtual desktop, the second virtual desktop, and the third virtual desktop of the presentation space of the single display capable of including a different number and a different order of application-specific menu elements.

88. The apparatus of claim 87, wherein the apparatus is configured for allowing a user to navigate among different windows associated with different virtual desktops.

89. The apparatus of claim 1, wherein the apparatus is configured such that:
the first visual component, the second visual component, and the third visual component are each included in the presentation space via a first virtual presentation space of the presentation space of the display which includes a single display;

the apparatus further comprises:
a second virtual presentation space of the presentation space of the single display that is capable of including at least one of the first visual component, the second visual component, or the third visual component, and
a third virtual presentation space of the presentation space of the single display that is capable of including at least one of the first visual component, the second visual component, or the third visual component; and
the first virtual presentation space, the second virtual presentation space, and the third virtual presentation space of the presentation space of the single display each include different versions of a menu that differ in a number and an order of application-specific visual elements included therewith.

90. The apparatus of claim 14, wherein the apparatus is configured such that navigation information is sent to cause the presentation of the second window, and the navigation information is not sent to the second application.

91. The apparatus of claim 14, wherein the apparatus is configured such that:
the representation of the second window includes a particular window of the second application and an icon that identifies the second application;
the menu is presented if the first user input includes predetermined input that changes a size and a location of the first window such that the first window is not maximized and not minimized;
the menu is not presented if the first window is presented in a maximized state, and the menu is re-presented if the first window is returned to a non-maximized state;
the elements of the menu are organized in an array of spaced thumbnails;
an order of each of the elements of the menu is presented based on: a z-order associated with a corresponding application, and a particular user input;
the menu excludes the representation of the first window as an element thereof when the first window is presented;
the area and the another area are: of different sizes, at least partially overlap, and overlay different parts of a desktop; and
the area includes at least one of: another menu, the menu in a different location, or another instance of the menu, that: has different-sized elements with respect to the menu, and excludes the representation of the second window as an element thereof when the second window is presented.

92. The apparatus of claim 91, wherein the apparatus is configured such that:
the first window, the second window, and the third window are each presented in the presentation space via a first virtual presentation space of the presentation space of the display which includes a single display;
the apparatus further comprises:
a second virtual presentation space of the presentation space of the single display that is capable of including at least one of the first window, the second window, or the third window, and
a third virtual presentation space of the presentation space of the single display that is capable of including at least one of the first window, the second window, or the third window; and
the first virtual presentation space, the second virtual presentation space, and the third virtual presentation space of the presentation space of the single display each include different menu versions that differ in a number and an order of application-specific visual elements included therewith.

93. The apparatus of claim 91, wherein the apparatus is configured such that the menu:
is presented outside of the first window,
is moved and re-sized as a function of the movement and the re-sizing of the first window, and
includes the array of spaced thumbnails that each reflect state information of at least one of the applications except the first application,
all for the purpose of overlaying empty desktop space so as to permit convenient selection of at least one window of at least one of the applications, utilizing the array and the state information, instead of requiring a user to locate the at least one window among a clutter of different windows, all while presenting an unobstructed view of both the menu and the first window regardless of the movement and re-sizing of the menu and the first window.

94. The apparatus of claim 14, wherein the apparatus is configured such that:
the menu is presented if the first user input includes navigation-activate input that changes a size and a location of the first window such that the first window is not maximized and not minimized;
the menu is not presented if the first window is presented in a maximized state, and the menu is re-presented if the first window is returned to a non-maximized state;
the elements of the menu are organized in an array of spaced visual elements;
an order of each of the elements of the menu is presented based on a z-order associated with a corresponding application;
the menu excludes the representation of the first window as an element thereof when the first window is presented;
the area and the another area are: of different sizes, and are positioned over different parts of a desktop; and
the area includes different-sized elements with respect to the menu.

95. The apparatus of claim 94, wherein the apparatus is configured such that:
the first window, the second window, and the third window are each presented in the presentation space via a first virtual presentation space of the presentation space of the display which includes a single display;
the apparatus further comprises:
a second virtual presentation space of the presentation space of the single display that is capable of including at least one of the first window, the second window, or the third window, and
a third virtual presentation space of the presentation space of the single display that is capable of including at least one of the first window, the second window, or the third window; and
the first virtual presentation space, the second virtual presentation space, and the third virtual presentation space of the presentation space of the single display each include different menu versions that differ in a number and an order of application-specific visual elements included therewith.

96. The apparatus of claim 95, wherein the apparatus is configured such that the menu:
- is presented outside of the first window,
- is moved and re-sized as a function of the movement and the re-sizing of the first window, and
- includes the array of spaced visual elements that each reflect a state of at least one of the applications except the first application, all for overlaying empty desktop space so as to permit selection of and navigation to at least one window of at least one of the applications utilizing the array, instead of requiring a user to locate the at least one window among a clutter of different windows, all while presenting an unobstructed view of both the menu and the first window.

97. The apparatus of claim 14, wherein the apparatus is configured such that:
- the menu is not presented if the first window is presented in a maximized state, and the menu is re-presented if the first window is returned to a non-maximized state;
- the elements of the menu are organized in an array of spaced visual elements;
- the menu excludes the representation of the first window as an element thereof because the first window is already presented; and
- the area includes another menu version that: is outside the second window, has different-sized elements with respect to the menu, and excludes the representation of the second window as an element thereof because the second window is already presented.

98. The apparatus of claim 97, wherein the apparatus is configured such that the menu:
- is presented outside of the first window,
- is moved and re-sized as a function of the movement and the re-sizing of the first window, and
- includes the array of spaced visual elements that each reflect state information of at least one of the applications except the first application, all for the purpose of overlaying empty desktop space so as to permit convenient selection of at least one window of at least one of the applications, utilizing the array and the state information, instead of requiring a user to locate the at least one window among a clutter of different windows, all while presenting an unobstructed view of both the menu and the first window regardless of the movement and re-sizing of the menu and the first window.

99. The apparatus of claim 98, wherein the apparatus is configured such that:
- the first window, the second window, and the third window are each presented in the presentation space via a first virtual presentation space of the presentation space of the display which includes a single display;
- the apparatus further comprises:
  - a second virtual presentation space of the presentation space of the single display that is capable of including at least one of the first window, the second window, or the third window, and
  - a third virtual presentation space of the presentation space of the single display that is capable of including at least one of the first window, the second window, or the third window; and
- the first virtual presentation space, the second virtual presentation space, and the third virtual presentation space of the presentation space of the single display each include different menu versions that differ in a number and an order of application-specific visual elements included therewith.

100. The apparatus of claim 14, wherein the apparatus is configured to present the area in connection with the second window of the second application in the plurality of applications, by presenting the area in response to particular user input after the second user input, where the particular user input involves a top portion of the second window.

101. The apparatus of claim 1, wherein the apparatus is configured such that:
- the first visual component includes a first window, the second visual component includes a second window, and the third visual component includes a third window;
- the representation of the second window is one of a plurality of elements of a menu;
- the representation of the second window includes a particular window of the second application and an icon that identifies the second application;
- the menu is conditionally presented based on whether the first user input involves a top of the first window and a particular location of the presentation space of the display, and further based on whether the first user input includes predetermined input that changes a size and a location of the first window such that the first window is not maximized and not minimized;
- the menu is not presented if the first window is presented in a maximized state, and the menu is re-presented if the first window is returned to a non-maximized state;
- the elements of the menu are organized in an array of spaced thumbnails;
- an order of each of the elements of the menu is presented based on: a z-order associated with a corresponding application, and a particular user input;
- the menu excludes the representation of the first window as an element thereof when the first window is presented;
- the menu is moved as a function of a movement of the first window resulting from user movement input;
- the menu is re-sized as a function of a re-sizing of the first window resulting from user re-sizing input;
- the menu is presented in another area that is outside of the first window;
- the another area is positioned at a first place with respect to the first window if the first user input includes a first particular input, and the another area is positioned at a second place with respect to the first window if the first user input includes a second particular input, the first place and the second place being positioned adjacent to different sides of the first window;
- the area is positioned at a third place with respect to the second window if predetermined user input after the second user input includes a first certain input, and the area is positioned at a fourth place with respect to the second window if the predetermined user input includes a second certain input, the third place and the fourth place being positioned adjacent to different sides of the second window;
- the area and the another area are: of different sizes, at least partially overlap, and are positioned over different parts of a desktop; and
- the area includes at least one of: another menu, the menu in a different location, or another instance of the menu, that: has different-sized elements with respect to the menu, and excludes the representation of the second window as an element thereof when the second window is presented.

102. The apparatus of claim 101, wherein the apparatus is configured such that:

the first window, the second window, and the third window are each presented in the presentation space via a first virtual presentation space of the presentation space of the display which includes a single display;

the apparatus further comprises:
  a second virtual presentation space of the presentation space of the single display that is capable of including at least one of the first window, the second window, or the third window, and
  a third virtual presentation space of the presentation space of the single display that is capable of including at least one of the first window, the second window, or the third window; and the first virtual presentation space, the second virtual presentation space, and the third virtual presentation space of the presentation space of the single display each include different menu versions that differ in a number and an order of application-specific visual elements included therewith.

103. The apparatus of claim 102, wherein the apparatus is configured such that the menu:
  is presented outside of the first window,
  is moved and re-sized as a function of the movement and the re-sizing of the first window, and
  includes the array of spaced thumbnails,
all to permit selection and navigation of presentation and input focus to at least one window of at least one of the applications from the array instead of requiring a user to locate the at least one window among a clutter of different windows and instead of using a desktop task bar.

104. The apparatus of claim 1, wherein the apparatus is configured such that:
  the representation of the second visual component is conditionally presented based on whether the first user input involves a top of the first visual component and a particular location of the presentation space of the display, and further based on whether the first user input includes particular input that changes a size and a location of the first visual component such that the first visual component is not maximized and not minimized;
  the menu is not presented if the first visual component is presented in a maximized state, and the menu is re-presented if the first visual component is returned to a non-maximized state;
  the representation of the second visual component is one of a plurality of elements of a menu;
  the elements of the menu are organized in an array of spaced visual elements;
  an order of each of the elements of the menu is presented based on: a z-order associated with a corresponding application, and a particular user input;
  the menu excludes the representation of the first visual component as an element thereof when the first visual component is presented;
  the menu is presented in another area that is outside of the first visual component; and
  the area and the another area are: of different sizes, at least partially overlap, and are positioned over different parts of a desktop.

105. The apparatus of claim 104, wherein the apparatus is configured such that the area includes at least one of: another menu, the menu in a different location, or another instance of the menu, that: has different-sized elements with respect to the menu, and excludes the representation of the second visual component as an element thereof when the second visual component is presented.

106. The apparatus of claim 104, wherein the apparatus is configured such that:
  the first visual component, the second visual component, and the third visual component are each presented in the presentation space via a first virtual presentation space of the presentation space of the display which includes a single display;

the apparatus further comprises:
  a second virtual presentation space of the presentation space of the single display that presents another first visual component, another second visual component, and another third visual component, and
  a third virtual presentation space of the presentation space of the single display that presents yet another first visual component, yet another second visual component, and yet another third visual component; and the first virtual presentation space, the second virtual presentation space, and the third virtual presentation space of the presentation space of the single display each include different menu versions that differ in a number and an order of application-specific visual elements included therewith.

107. The apparatus of claim 104, wherein the apparatus is configured such that the menu:
  is presented outside of the first visual component,
  is moved and re-sized as a function of a movement and a re-sizing of the first visual component, and
  includes the array of spaced visual elements that each reflect a state of at least one of the applications except the first visual component,
all for overlaying empty desktop space so as to permit convenient selection of and navigation of presentation and input focus to at least one visual component of at least one of the applications from the array based on the state, instead of requiring a user to locate the at least one visual component among a clutter of different visual components and instead of using a desktop task bar, all while presenting an unobstructed view of both the array and the first visual component regardless of the movement and the re-sizing of the menu and the first visual component.

108. The apparatus of claim 1, wherein the apparatus is configured such that:
  the first visual component includes a first window, the second visual component includes a second window, and the third visual component includes a third window;
  the representation of the second window is one of a plurality of elements of a menu;
  the menu is not presented if the first window is presented in a maximized state, and the menu is re-presented if the first window is returned to a non-maximized state;
  the elements of the menu are organized in an array of spaced visual elements;
  an order of each of the elements of the menu is presented based on: a z-order associated with a corresponding application, and a particular user input;
  the menu excludes the representation of the first window as an element thereof when the first window is presented;
  the menu is moved as a function of a movement of the first window resulting from user movement input;
  the menu is re-sized as a function of a re-sizing of the first window resulting from user re-sizing input;
  the menu is presented in another area that is outside of the first window;

the another area is positioned at a first place with respect to the first window if the first user input includes a first particular input, and the another area is positioned at a second place with respect to the first window if the first user input includes a second particular input, the first place and the second place being positioned adjacent to different sides of the first window;

the area is positioned at a third place with respect to the second window if a first certain input is detected after the second user input, and the area is positioned at a fourth place with respect to the second window if a second certain input is detected after the second user input, the third place and the fourth place being positioned adjacent to different sides of the second window;

the area and the another area are: of different sizes, at least partially overlap, and are positioned over different parts of a desktop; and the area includes different-sized elements with respect to the menu, and excludes the representation of the second window as an element thereof when the second window is presented.

109. The apparatus of claim 1, wherein the apparatus is configured such that:

the first visual component includes a first window, the second visual component includes a second window, and the third visual component includes a third window;

the representation of the second window is one of a plurality of elements of a menu;

the menu is conditionally presented if the first user input involves a top of the first window and a particular location of the presentation space of the display;

the menu is presented in another area that is outside of the first window;

the menu is moved as a function of a movement of the first window;

the menu is re-sized as a function of a re-sizing of the first window;

the another area is positioned at a first place with respect to the first window if the first user input includes a first particular input;

the another area is positioned at a second place with respect to the first window if the first user input includes a second particular input;

the menu does not include the representation of the first window;

the apparatus is configured such that the area and the another area are positioned over different parts of a desktop;

the area involves another menu version that does not include the representation of the second window, where the another menu version in the area is positioned in a different location and is of a different size with respect to the menu in the another area;

the area and the another menu are presented if certain user input is detected after the second user input and involves a top of the second window and another particular location of the presentation space of the display;

the menu is hidden if the first window is maximized, and re-presented if the first window is returned to a non-maximized state;

the elements of the menu are organized in an arrangement and do not overlap; and the elements of the menu are each presented based on a z-order attribute of a corresponding application.

110. The apparatus of claim 109, wherein the apparatus is configured such that:

the first window, the second window, and the third window are each presented in the presentation space via a first virtual presentation space of the presentation space of the display which includes a single display;

the apparatus further comprises:

a second virtual presentation space of the presentation space of the single display that is capable of including at least one of the first window, the second window, or the third window, and a third virtual presentation space of the presentation space of the single display that is capable of including at least one of the first window, the second window, or the third window;

the first virtual presentation space, the second virtual presentation space, and the third virtual presentation space of the presentation space of the single display each include different menu versions that differ with respect to application-specific visual elements included therewith; and the apparatus is configured such that the menu:

is presented outside of the first window, is moved and re-sized as a function of the movement and the re-sizing of the first window, and includes the arrangement that reflects a state of at least one of the applications except the first application, all for permitting a user to navigate to at least one window of at least one of the applications utilizing the arrangement and the state, instead of requiring a user to locate the at least one window among a clutter of different windows, all while presenting an unobstructed view of both the menu and the first window regardless of the movement and re-sizing of the menu and the first window.

111. The apparatus of claim 1, wherein the apparatus is configured such that:

the first visual component includes a first window, the second visual component includes a second window, and the third visual component includes a third window;

the representation of the second window is one of a plurality elements of a menu;

the menu is conditionally presented if the first user input involves a top of the first window and a particular location of the presentation space of the display;

the menu is presented in another area that is outside of the first window;

the menu is moved as a function of a movement of the first window;

the menu is re-sized as a function of a re-sizing of the first window;

the another area is positioned at a first place with respect to the first window if the first user input includes a first particular input;

the another area is positioned at a second place with respect to the first window if the first user input includes a second particular input;

the menu does not include the representation of the first window;

the menu is presented in the another area that is outside of the first window and is further moved and re-sized, for overlaying empty desktop space, that changes as a function of the movement and the re-sizing of the first window and is otherwise utilized for displaying different windows of the applications, to simultaneously provide a user a view of a state of the second application and an unobstructed view of an entirety of the first window;

the representation of the second window includes a particular window of the second application and an icon that identifies the second application;

the apparatus is configured such that the area and the another area are positioned over different parts of a desktop;

the area involves another form of the menu that does not include the representation of the second window, is positioned in a different location, and is of a different size with respect to the menu in the another area;

the area is presented in response to a detection of certain user input after the second user input that involves a top of the second window and another particular location of the presentation space of the display;

the menu is hidden if the first window is maximized, and re-presented if the first window is returned to a non-maximized state;

the elements of the menu are organized in a grid and do not overlap; and the elements of the menu are each presented based on a z-order attribute of a corresponding application.

112. The apparatus of claim 111, wherein the apparatus is configured such that:

the first window, the second window, and the third window are each presented in the presentation space via a first virtual presentation space of the presentation space of the display which includes a single display;

the apparatus further comprises:

a second virtual presentation space of the presentation space of the single display that is capable of including at least two of the first window, the second window, or the third window, and a third virtual presentation space of the presentation space of the single display that is capable of including at least two of the first window, the second window, or the third window; and the first virtual presentation space, the second virtual presentation space, and the third virtual presentation space of the presentation space of the single display each include different menu forms that differ with respect to application-specific visual elements included therewith.

113. An apparatus, comprising:

at least one processor;

a display operatively coupled to the at least one processor;

at least one input device operatively coupled to the at least one processor;

memory operatively coupled to the at least one processor;

said memory operatively coupled to the at least one processor configured to store a plurality of applications including a first application and a second application;

said display operatively coupled to the at least one processor configured to present, utilizing the at least one processor, a first window of the first application in the plurality of applications, in a first application region of a presentation space of the display;

said at least one input device operatively coupled to the at least one processor configured to detect, utilizing the at least one processor, first user input in connection with the first window of the first application, by detecting a gesture defined as a navigation-activate input received on a predetermined top location of the first window and in a predetermined location of the presentation space of the display;

said display operatively coupled to the at least one processor configured to, in response to the detection of the first user input in connection with the first window of the first application, present, utilizing the at least one processor, a representation of a second window of the second application in the plurality of applications based on a second application state of the second application, in a first control region of the presentation space of the display determined based on the first application region, for navigating to the second window of the second application, in a second application region in the presentation space of the display, the first control region being determined based on the first application region by determining a first location adjacent to a second location of the first window;

said at least one input device operatively coupled to the at least one processor configured to detect, utilizing the at least one processor, second user input in connection with the representation of the second window of the second application in the plurality of applications;

said display operatively coupled to the at least one processor configured to, in response to the detection of the second user input in connection with the representation of the second window of the second application in the plurality of applications, present, utilizing the at least one processor, the second window of the second application in the plurality of applications;

said display operatively coupled to the at least one processor configured to, after the presentation of the second window of the second application in the plurality of applications, present, utilizing the at least one processor, an area not including the representation of the second window and including a representation of a third window of a third application in the plurality of applications based on a third application state of the third application, in a second control region of the presentation space of the display determined based on a second application region of the presentation space of the display in which the second window of the second application is presented, for navigating to the third window of the third application, in a third application region in the presentation space of the display, the second control region being determined based on the second application region by determining a third location adjacent to a fourth location of the second window;

said at least one input device operatively coupled to the at least one processor configured to detect, utilizing the at least one processor, third user input in connection with the representation of the third window of the third application in the plurality of applications;

said display operatively coupled to the at least one processor configured to, in response to the detection of the third user input in connection with the representation of the third window of the third application in the plurality of applications, present, utilizing the at least one processor and the display, the third window of the third application in the plurality of applications;

said at least one input device operatively coupled to the at least one processor configured to detect, utilizing the at least one processor, fourth user input in connection with the first window of the first application;

said display operatively coupled to the at least one processor configured to, in response to the detection of the fourth user input in connection with the first window of the first application, moving, utilizing the at least one processor, the second location of the first window of the first application, to a fifth location;

said display operatively coupled to the at least one processor configured to, in response to the detection of the fourth user input in connection with the first window of the first application, moving, utilizing the at least one processor, the representation of the second window of the second application in the plurality of applications to a sixth location adjacent to the fifth location;

wherein the apparatus is configured such that the representation of the second window is presented at the first location adjacent to the second location of the first window, for allowing a user to view a state of the second window of the second application and select the second application among the plurality of applications such that the second window of the second application is capable of being presented along with the first window of the first application.

114. The apparatus of claim 113, wherein the apparatus is configured such that:

the representation of the second window is one of a plurality of elements of a menu;

the representation of the second window includes a particular window of the second application and a particular visual interface element that identifies the second application, the representation of the third window includes another particular window of the third application and another particular visual interface element that identifies the third application;

the menu is presented in another area that is exterior to the first window;

the menu is positioned at a first location with respect to the first window if the first user input includes a first particular input and the menu is positioned at a second location with respect to the first window if the first user input includes second particular input; and the menu does not include the representation of the first window.

115. The apparatus of claim 114, wherein the apparatus is configured such that the area and the another area are positioned, at least in part, in different regions and are of different sizes.

116. The apparatus of claim 114, wherein the apparatus is configured such that the area and the another area are included in different parts of a desktop.

117. The apparatus of claim 116, wherein the apparatus is configured such that the area and the another area overlap, at least in part.

118. The apparatus of claim 114, wherein the apparatus is configured such that the first control region and the second control region each include at least a first portion that shares a same portion of the presentation space and at least a second portion that occupies different portions of the presentation space.

119. The apparatus of claim 114, wherein the apparatus is configured such that the first location is adjacent to the second location such that the first control region resides at least in part in a desktop portion of the presentation space and does not overlap with the first window.

120. The apparatus of claim 114, wherein the apparatus is configured such that the menu is conditionally presented if the first user input moves and re-sizes the first window such that the first window is not maximized and not minimized.

121. The apparatus of claim 114, wherein the apparatus is configured such that the menu is hidden if the first window is maximized.

122. The apparatus of claim 121, wherein the apparatus is configured such that the menu is re-presented if the first window is returned to a non-maximized state.

123. The apparatus of claim 121, wherein the apparatus is configured such that the menu is re-presented if the first window is the subject of another instance of the gesture.

124. The apparatus of claim 114, wherein the apparatus is configured such that the elements of the menu do not overlap.

125. The apparatus of claim 1, wherein the apparatus is configured such that the first visual component includes a first window, the second visual component includes a second window, and the third visual component includes a third window, and the representation of the second window includes one of a plurality of elements of a menu that is presented if the first user input includes a particular input involving a top of the first window that is predetermined to present the menu such that the menu resides exterior to and does not overlay the first window and at least partially overlays a desktop, and moves within the desktop as a function of a movement of the first window by a user.

126. The apparatus of claim 1, wherein the apparatus is configured such that the first visual component includes a first window, the second visual component includes a second window, and the third visual component includes a third window, and the representation of the second window includes one of a plurality of elements of a menu that is conditionally presented if the first user input includes a particular input involving a top of the first window and a particular location of the presentation space of the display and is predetermined to cause presentation of the menu in a menu region exterior to the first window that moves and is re-sized as a function of a movement and re-sizing of the first window, where the menu does not include the representation of the first window when the first window is presented.

127. The apparatus of claim 1, wherein the apparatus is configured such that the first visual component includes a first window, the second visual component includes a second window, and the third visual component includes a third window; where, in automatic response to the detection of the first user input that takes the form of a predetermined navigation-activate input that changes at least one aspect of the first window, the representation of the second window is conditionally presented, based on whether the second application is operating, in a menu list that is a parent of the first window that moves as a function of movement of the first window; and where, in automatic response to the detection of the first user input that takes the form of the predetermined navigation-activate input that changes the at least one aspect of the first window, the representation of the third window is conditionally presented, based on whether the third application is operating, in the menu list, and moves as a function of movement of the first window.

128. The apparatus of claim 1, wherein the apparatus is configured such that at least one of:

said processor includes an instruction processing unit;

said memory includes at least one of processor memory, or persistent secondary memory;

said display includes at least part of a touchscreen;

said at least one input device includes at least part of a touchscreen;

said at least one input device detects the first user input by receiving a signal that results from a user manipulation of the at least one input device;

said at least one input device utilizes the at least one processor during each instance of the detecting by communicating one or more signals to or from the at least one processor in connection with operation of the at least one input device;

said at least one input device utilizes the at least one processor during each instance of the detecting by communicating one or more signals to or from the at least one processor in connection with a user manipulation of the at least one input device;
said at least one input device utilizes the at least one processor during each instance of the detecting by interfacing with the at least one processor;
said display utilizes the at least one processor during each instance of displaying by receiving presentation information therefrom;
said apparatus is configured to avoid a requirement of a repetition of same or similar types of inputs;
said apparatus is configured to avoid a requirement of a repetition of same or similar user movements;
said first user input precedes the second user input, and the second user input precedes the third user input;
said apparatus is configured to avoid use of a standard menu of a desktop;
said apparatus is configured to avoid use of a taskbar of a desktop;
said apparatus is configured to avoid access to a single location of a desktop;
said apparatus is configured for switching between the applications;
each instance of said user input results in an instruction;
each instance of said at least operative coupling involving at least one bus;
said first control region includes a first navigation region and the second control region includes a second navigation region;
said representation of the second visual component includes at least one of a navigation control, an application control, or a visual component control;
said representation of the third visual component includes at least one of a navigation control, an application control, or a visual component control;
said representation of the second visual component includes the second visual component;
said representation of the third visual component includes the third visual component;
said apparatus is capable of allowing navigation between at least two of the windows;
said representation of the second visual component and the representation of the third visual component are part of the same menu;
said area is part of the second control region;
said area is part of a menu in the second control region;
said area is presented in response to additional user input following the second user input;
said first window, the second window, and the third window are presented with input focus thereon; or
said first window and the second window each includes separate representations of one or more of the windows.

129. The apparatus of claim 1, wherein the apparatus is configured such that:
the first visual component includes a first window, the second visual component includes a second window, and the third visual component includes a third window;
a first spaced and organized group is presented in a first area outside the first window and includes the representation of the second window and the representation of the third window, but does not include the representation of the first window;
the first spaced and organized group is presented if the first user input involves a top of the first window and a particular location of the presentation space of the display resulting in the first window being neither maximized nor minimized;
the first spaced and organized group is presented in a first place with respect to the first window if the first user input involves first particular input, and in a second place with respect to the first window if the first user input involves second particular input;
the first spaced and organized group, and the representation of the second window and the representation of the third window thereof are moved if the first window is moved, and are re-sized if the first window is re-sized;
the first spaced and organized group is hidden if the first window is maximized;
the area is a second area outside the second window in which a second spaced and organized group is presented that includes the representation of the third window, but does not include the representation of the first window and the representation of the second window;
the second spaced and organized group is presented in response to a detection of a fourth user input that involves a top of the second window and another particular location of the presentation space of the display resulting in the second window being neither maximized nor minimized;
the second spaced and organized group is presented in a third place with respect to the second window if the fourth user input involves first certain input, and in a fourth place with respect to the second window if the fourth user input involves second certain input;
the second spaced and organized group and the representation of the third window thereof are moved if the second window is moved, and are re-sized if the second window is re-sized; and
the second spaced and organized group is hidden if the second window is maximized.

130. The apparatus of claim 129, wherein the apparatus is configured such that the first spaced and organized group and the second spaced and organized group overlay empty desktop space so as to permit selection of at least one window of at least one of the applications, instead of requiring a user to locate the at least one window among a clutter of different windows and instead of requiring use of a desktop taskbar that remains in a single location.

131. A computer program product embodied on a non-transitory computer readable medium, comprising:
code configured to a cooperate with a device including at least one processor operatively coupled to a display and memory storing a plurality of applications including a first application and a second application, the code configured to cause the device to:
present, utilizing the at least one processor and the display, a first visual component of the first application in the plurality of applications, in a first application region of a presentation space of the display;
detect, utilizing the at least one processor, first user input in connection with the first visual component of the first application;
in response to the detection of the first user input in connection with the first visual component of the first application, present, utilizing the at least one processor and the display, a representation of a second visual component of the second application in the plurality of applications, in a first control region of the presentation space of the display based on the first application region, for navigating to the second visual component of the second application, in a second application region in the presentation space of the display, the first control region being based on the first application region by being at a first location adjacent to a second location of the first visual component;

detect, utilizing the at least one processor, second user input in connection with the representation of the second visual component of the second application in the plurality of applications;

in response to the detection of the second user input in connection with the representation of the second visual component of the second application in the plurality of applications, present, utilizing the at least one processor and the display, the second visual component of the second application in the plurality of applications;

in connection with the second visual component of the second application in the plurality of applications, present, utilizing the at least one processor and the display, an area not including the representation of the second visual component and including a representation of a third visual component of a third application in the plurality of applications, in a second control region of the presentation space of the display based on a second application region of the presentation space of the display in which the second visual component of the second application is presented, for navigating to the third visual component of the third application, in a third application region in the presentation space of the display, the second control region being based on the second application region by being at a third location adjacent to a fourth location of the second visual component;

detect, utilizing the at least one processor, third user input in connection with the representation of the third visual component of the third application in the plurality of applications; and in response to the detection of the third user input in connection with the representation of the third visual component of the third application in the plurality of applications, present, utilizing the at least one processor and the display, the third visual component of the third application in the plurality of applications.

132. The computer program product of claim 131, wherein the code is configured to cause the device to:

detect, utilizing the at least one processor, fourth user input in connection with the first visual component of the first application;

in response to the detection of the, fourth user input in connection with the first visual component of the first application, moving, utilizing the at least one processor and the display, the second location of the first visual component of the first application, to a fifth location;

in response to the detection of the, fourth user input in connection with the first visual component of the first application, moving, utilizing the at least one processor and the display, the representation of the second visual component of the second application in the plurality of applications to a sixth location adjacent to the fifth location.

133. The computer program product of claim 131, wherein the code is configured to cause the device to detect the first user input in connection with the first visual component of the first application, by detecting a gesture defined as a navigation-activate input in connection with a predetermined location of the presentation space of the display.

134. The computer program product of claim 131, wherein the code is configured to cause the device to detect the first user input in connection with the first visual component of the first application, by detecting an instruction that results in the first visual component of the first application being in a state that is neither minimized nor maximized.

135. The computer program product of claim 131, wherein the code is configured to cause the device to detect the first user input in connection with the first visual component of the first application, by detecting a movement that is predetermined to be an execution environment navigation-activate input for each of the plurality of applications of an execution environment including the plurality of applications.

136. The computer program product of claim 131, wherein the code is configured to cause the device to conditionally present the representation of the second visual component of the second application in the plurality of applications, based on whether the detected first user input includes a gesture defined as a navigation-activate input received on a predetermined top location of the first visual component and in a predetermined location of the presentation space of the display.

137. The computer program product of claim 131, wherein the code is configured to cause the device to operate such that the representation of the second visual component of the second application is conditionally included, in response to the detection of the first user input in connection with the first visual component of the first application, based on a state of the second application.

138. The computer program product of claim 131, wherein the code is configured to cause the device to operate such that the representation of the second visual component of the second application is conditionally included, in response to the detection of the first user input in connection with the first visual component of the first application, based on a state of a process or thread context of the second application.

139. The computer program product of claim 131, wherein the code is configured to cause the device to operate such that the representation of the second visual component of the second application is conditionally included, in response to the detection of the first user input in connection with the first visual component of the first application, based on whether the second application is operating and at least one aspect that is based on a user input.

140. The computer program product of claim 131, wherein the code is configured to cause the device to operate such that the first control region is based on the first application region by being at the first location which is to a side of the second location of the first visual component, such that the representation of the second visual component of the second application in the plurality of applications is presented outside the first visual component of the first application.

141. The computer program product of claim 131, wherein the code is configured to cause the device to operate such that the second visual component of the second application in the plurality of applications is presented in addition to the first visual component of the first application in the plurality of applications, in response to the detection of the second user input.

142. The computer program product of claim 131, wherein the code is configured to cause the device to operate such that the representation of the second visual component is presented at the first location adjacent to the second location of the first visual component, for allowing a user to view a state of the second application and select the second application among the plurality of applications such that the second visual component of the second application is capable of being presented along with the first visual component of the first application.

143. The computer program product of claim 131, wherein the code is configured to cause the device to operate such that the representation of the second visual component of the second application in the plurality of applications is hidden, in response to the first visual component of the first application being maximized.

144. The computer program product of claim 131, wherein the computer program product is configured such that:
- the first visual component includes a first window, the second visual component includes a second window, and the third visual component includes a third window;
- a first spaced group is presented in a first area outside the first window and includes the representation of the second window and the representation of the third window, but does not include the representation of the first window;
- the first spaced group is presented if the first user input involves a top of the first window and a particular location of the presentation space of the display;
- the first spaced group is presented in a first place with respect to the first window if the first user input involves first particular input, and in a second place with respect to the first window if the first user input involves second particular input;
- the first spaced group, the representation of the second window, and the representation of the third window are moved if the first window is moved, and are re-sized if the first window is re-sized;
- the area is a second area outside the second window in which a second spaced group is presented that includes the representation of the third window, but does not include the representation of the first window and the representation of the second window;
- the second spaced group is presented in response to a detection of a fourth user input that involves a top of the second window and another particular location of the presentation space of the display;
- the second spaced group is presented in a third place with respect to the second window if the fourth user input involves first certain input, and in a fourth place with respect to the second window if the fourth user input involves second certain input; and
- the second spaced group and the representation of the third window are moved if the second window is moved, and are re-sized if the second window is re-sized.

145. The computer program product of claim 144, wherein the computer program product is configured such that the first spaced group and the second spaced group overlay empty desktop space so as to permit selection of at least one window of at least one of the applications, instead of requiring a user to locate the at least one window among a clutter of different windows.

146. The apparatus of claim 113, wherein the apparatus is configured such that:
- said at least one input device operatively coupled to the at least one processor configured to detect, utilizing the at least one processor, fifth user input in connection with the first window of the first application;
- said display operatively coupled to the at least one processor configured to, in response to the detection of the fifth user input in connection with the first window of the first application, re-sizing, utilizing the at least one processor, the first window of the first application;
- said display operatively coupled to the at least one processor configured to, in response to the detection of the fifth user input in connection with the first window of the first application, re-sizing, utilizing the at least one processor, the representation of the second window of the second application in the plurality of applications.

147. The apparatus of claim 113, wherein the apparatus is configured such that the at least one input device and the display are integrated in the form of a touchscreen.

148. The apparatus of claim 113, wherein the apparatus is configured to present the area after the presentation of the second window of the second application in the plurality of applications, by presenting the area in response to particular user input after the second user input, where the particular user input is detected by detecting the gesture defined as the navigation-activate input received on a predetermined top location of the second window and in another predetermined location of the presentation space of the display.

149. The apparatus of claim 113, wherein the apparatus is configured such that: the representation of the second window is one of a plurality of elements of a menu; the menu is presented in another area that is outside of the first window; the menu is moved as a function of a movement of the first window; the menu is re-sized as a function of a re-sizing of the first window; the another area is positioned at a first place with respect to the first window if the first user input includes a first particular input; the another area is positioned at a second place with respect to the first window if the first user input includes a second particular input; and the menu does not include the representation of the first window.

150. The apparatus of claim 149, wherein the apparatus is configured such that:
- the menu is hidden if the first window is presented in a maximized state, and the menu is re-presented if the first window is subject to another instance of the gesture;
- the elements of the menu are organized in an array of spaced visual elements;
- the menu excludes the representation of the first window as one of the elements thereof because the first window is already presented;
- the area includes another form of the menu that: is outside the second window, has different-sized elements with respect to the menu, and excludes the representation of the second window as one of the elements thereof because the second window is already presented; and
- the area is presented if certain user input is detected after the second user input and involves a top of the second window and another particular location of the presentation space of the display.

151. The apparatus of claim 150, wherein the apparatus is configured such that the menu:
- is presented outside of the first window,
- is moved and re-sized as a function of the movement and the re-sizing of the first window, and
- includes the array of spaced visual elements that each reflect state information of at least one of the applications except the first application, all for the purpose of overlaying empty desktop space so as to permit convenient selection of at least one window of at least one of the applications, utilizing the array and the state information, instead of requiring a user to locate the at least one window among a clutter of different windows, all while presenting an unobstructed view of both the menu and the first window regardless of the movement and re-sizing of the menu and the first window.

152. The apparatus of claim 113, wherein the apparatus is configured such that:
 a first spaced and organized group is presented in a first area outside the first window and includes the representation of the second window and the representation of the third window, but does not include the representation of the first window;
 the first spaced and organized group is presented in a first place with respect to the first window if the first user input involves first particular input, and in a second place with respect to the first window if the first user input involves second particular input;
 the first spaced and organized group, and the representation of the second window and the representation of the third window thereof are re-sized if the first window is re-sized;
 the first spaced and organized group is hidden if the first window is maximized;
 the area is a second area outside the second window in which a second spaced and organized group is presented that includes the representation of the third window, but does not include the representation of the first window and the representation of the second window;
 the second spaced and organized group is presented in response to a detection of a fourth user input that involves a top of the second window and another particular location of the presentation space of the display;
 the second spaced and organized group is presented in a third place with respect to the second window if the fourth user input involves first certain input, and in a fourth place with respect to the second window if the fourth user input involves second certain input;
 the second spaced and organized group and the representation of the third window thereof are re-sized if the second window is re-sized; and
 the second spaced and organized group is hidden if the second window is maximized.

153. The apparatus of claim 152, wherein the apparatus is configured such that the first spaced and organized group and the second spaced and organized group overlay empty desktop space so as to permit selection of at least one window of at least one of the applications, instead of requiring a user to locate the at least one window among a clutter of different windows.

154. A system, comprising:
 means for storing a plurality of applications including a first application and a second application; and
 means for:
  presenting a first visual component of the first application in the plurality of applications, in a first application region of a presentation space of a display;
  detecting first user input in connection with the first visual component of the first application;
  in response to the detection of the first user input in connection with the first visual component of the first application, presenting a representation of a second visual component of the second application in the plurality of applications, in a first control region of the presentation space of the display determined based on the first application region, for navigating to the second visual component of the second application, in a second application region in the presentation space of the display, the first control region being determined based on the first application region by determining a first location adjacent to a second location of the first visual component;
  detecting second user input in connection with the representation of the second visual component of the second application in the plurality of applications;
  in response to the detection of the second user input in connection with the representation of the second visual component of the second application in the plurality of applications, presenting the second visual component of the second application in the plurality of applications;
  in connection with the second visual component of the second application in the plurality of applications, present an area not including the representation of the second visual component and including a representation of a third visual component of a third application in the plurality of applications, in a second control region of the presentation space of the display based on a second application region of the presentation space of the display in which the second visual component of the second application is presented, for navigating to the third visual component of the third application, in a third application region in the presentation space of the display, the second control region being based on the second application region by being at a third location adjacent to a fourth location of the second visual component;
  detect third user input in connection with the representation of the third visual component of the third application in the plurality of applications; and
  in response to the detection of the third user input in connection with the representation of the third visual component of the third application in the plurality of applications, present the third visual component of the third application in the plurality of applications.

155. The system of claim 154, wherein the system is configured such that:
 the first visual component includes a first window, the second visual component includes a second window, and the third visual component includes a third window;
 a first spaced and organized group is presented in a first area outside the first window and includes the representation of the second window and the representation of the third window, but does not include the representation of the first window;
 the first spaced and organized group is presented if the first user input involves a top of the first window and a particular location of the presentation space of the display resulting in the first window being neither maximized nor minimized;
 the first spaced and organized group is presented in a first place with respect to the first window if the first user input involves first particular input, and in a second place with respect to the first window if the first user input involves second particular input;
 the first spaced and organized group, and the representation of the second window and the representation of the third window thereof are moved if the first window is moved, and are re-sized if the first window is re-sized;
 the first spaced and organized group is hidden if the first window is maximized;

the area is a second area outside the second window in which a second spaced and organized group is presented that includes the representation of the third window, but does not include the representation of the first window and the representation of the second window;

the second spaced and organized group is presented in response to a detection of a fourth user input that involves a top of the second window and another particular location of the presentation space of the display resulting in the second window being neither maximized nor minimized;

the second spaced and organized group is presented in a third place with respect to the second window if the fourth user input involves first certain input, and in a fourth place with respect to the second window if the fourth user input involves second certain input;

the second spaced and organized group and the representation of the third window thereof are moved if the second window is moved, and are re-sized if the second window is re-sized; and the second spaced and organized group is hidden if the second window is maximized.

156. The system of claim 155, wherein the system is configured such that the first spaced and organized group and the second spaced and organized group overlay empty desktop space so as to permit selection of at least one window of at least one of the applications, instead of requiring a user to locate the at least one window among a clutter of different windows.

* * * * *